(12) United States Patent
Mochizuki et al.

(10) Patent No.: US 11,487,984 B2
(45) Date of Patent: Nov. 1, 2022

(54) CONTACTLESSLY READABLE TAG, METHOD FOR MANUFACTURING CONTACTLESSLY READABLE TAG, IDENTIFICATION DEVICE, AND IDENTIFICATION INFORMATION DETERMINATION SYSTEM

(71) Applicant: Konica Minolta, Inc., Tokyo (JP)

(72) Inventors: Makoto Mochizuki, Koganei (JP); Takumi Ishiwata, Mitaka (JP)

(73) Assignee: Konica Minolta, Inc., Tokyo (JP)

( * ) Notice: Subject to any disclaimer, the term of this patent is extended or adjusted under 35 U.S.C. 154(b) by 43 days.

(21) Appl. No.: 15/733,997

(22) PCT Filed: Jun. 5, 2019

(86) PCT No.: PCT/JP2019/022278
§ 371 (c)(1),
(2) Date: Dec. 1, 2020

(87) PCT Pub. No.: WO2019/239976
PCT Pub. Date: Dec. 19, 2019

(65) Prior Publication Data
US 2021/0216843 A1 Jul. 15, 2021

(30) Foreign Application Priority Data
Jun. 11, 2018 (JP) .............................. JP2018-111011

(51) Int. Cl.
*G08B 13/14* (2006.01)
*G06K 19/077* (2006.01)
*G06K 19/07* (2006.01)

(52) U.S. Cl.
CPC ... *G06K 19/07771* (2013.01); *G06K 19/0723* (2013.01); *G06K 19/0776* (2013.01); *G06K 19/07722* (2013.01); *G06K 19/07735* (2013.01)

(58) Field of Classification Search
CPC ......... G06K 19/07771; G06K 19/0723; G06K 19/07722; G06K 19/07735; G06K 19/0776
(Continued)

(56) References Cited

U.S. PATENT DOCUMENTS 9,831,556 B2 * 11/2017 Yamagajo ............ H01Q 13/206
10,490,887 B2 * 11/2019 Schlaffer .................. H01Q 1/48
(Continued)

FOREIGN PATENT DOCUMENTS

JP 2016207011 12/2016
JP 2018-023021 A 2/2018

OTHER PUBLICATIONS

International Patent Application No. PCT/JP2019/022278; Int'l Preliminary Report on Patentability; dated Dec. 15, 2020; 10 pages.
(Continued)

*Primary Examiner* — Anh V La
(74) *Attorney, Agent, or Firm* — BakerHostetler

(57) ABSTRACT

A contactlessly readable tag includes a metal pattern layer, a conductive layer, and at least one intermediate layer. The intermediate layer has a relative permittivity of 0 or more and 2.5 or less and is provided between the metal pattern layer and the conductive layer. The metal pattern layer includes a metal part whose arrangement pattern corresponds to identification information. The identification information is configured to be identified based on information on an electromagnetic wave that is reflected by the contactlessly readable tag in response to irradiation of the
(Continued)

contactlessly readable tag with an electromagnetic wave. The metal pattern layer is provided closer to a reading surface of the contactlessly readable tag than at least one of the intermediate layer.

16 Claims, 13 Drawing Sheets

(58) Field of Classification Search
    USPC .......... 340/572.8, 572.1, 572.9, 572.4, 572.7
    See application file for complete search history.

(56) References Cited

U.S. PATENT DOCUMENTS

| | | | |
|---|---|---|---|
| 2009/0045964 A1* | 2/2009 | Takeda | G06K 19/07749 340/572.9 |
| 2010/0117833 A1* | 5/2010 | Kai | G06K 19/07767 340/572.1 |
| 2016/0212858 A1* | 7/2016 | Allenstein | G06K 19/07722 |
| 2018/0144225 A1* | 5/2018 | Kato | H01Q 1/2225 |

OTHER PUBLICATIONS

Chipless RFID Based on RF Encoding Particle, "Implementation and Measurements of Chipless RFID Tags," pp. 174-181 (2016).
International Search Report issued in PCT/JP2019/022278, dated Aug. 20, 2019.

* cited by examiner

FRONT ←→ BACK

FIG.30

| TAG No. | STRUCTURE OF BUFFER LAYER | DESIGN OF TAG ||||||||| WHEN TAG IS STUCK ON SURFACE OF ITEM ||| WHEN TAG IS STUCK ON INSIDE OF ITEM || EVALUATION OF PEAK SHARPNESS | EVALUATION WHEN SCRATCHED | REMARKS |
|---|---|---|---|---|---|---|---|---|---|---|---|---|---|---|---|---|---|
| | | MATERIAL OF BUFFER LAYER | εr OF BUFFER LAYER | THICKNESS OF BUFFER LAYER [μm] | SURFACE ROUGHNESS OF METAL PATTERN Rz [μm] | DISTANCE BETWEEN ADJACENT METAL PATTERNS [mm] | PROTECTION LAYER | ELECTROMAGNETIC WAVE ABSORBER LAYER | TYPE OF METAL PATTERN | CONFIGURATION OF TAG | CARDBOARD | ACRYLIC RESIN | STEEL PLATE | CARDBOARD | ACRYLIC RESIN | | | |
| 1 | PARTITION WALL STRUCTURE | | 1.5 | 100 | 0.1 | 1 | NONE | NONE | STRIPLINE TYPE | EMBODIMENT 2 | BB | BB | BB | BB | BB | BB | BB | EXAMPLE 1 |
| 2 | PARTITION WALL STRUCTURE | | 2.0 | 100 | 0.1 | 1 | NONE | NONE | STRIPLINE TYPE | EMBODIMENT 2 | BB | BB | BB | BB | BB | BB | BB | EXAMPLE 2 |
| 3 | PARTITION WALL STRUCTURE | | 2.0 | 100 | 0.1 | 1 | NONE | NONE | STRIPLINE TYPE | EMBODIMENT 4 | BB | BB | BB | BB | BB | BB | BB | EXAMPLE 3 |
| 4 | PARTITION WALL STRUCTURE | | 2.0 | 100 | 0.1 | 1 | NONE | NONE | STRIPLINE TYPE | EMBODIMENT 7 | BB | BB | BB | BB | BB | BB | BB | EXAMPLE 4 |
| 5 | PARTITION WALL STRUCTURE | | 2.5 | 100 | 0.1 | 1 | NONE | NONE | STRIPLINE TYPE | EMBODIMENT 2 | BB | BB | BB | BB | BB | BB | BB | EXAMPLE 5 |
| 6 | PARTITION WALL STRUCTURE | | 3.0 | 100 | 0.1 | 1 | NONE | NONE | STRIPLINE TYPE | EMBODIMENT 2 | BB | BB | BB | BB | BB | BB | BB | EXAMPLE 6 |
| 7 | PARTITION WALL STRUCTURE | POROUS MATERIAL | 2.0 | 50 | 0.1 | 1 | NONE | NONE | STRIPLINE TYPE | EMBODIMENT 2 | BB | BB | BB | BB | BB | BB | BB | EXAMPLE 7 |
| 8 | PARTITION WALL STRUCTURE | POROUS MATERIAL | 2.0 | 10 | 0.1 | 1 | NONE | NONE | STRIPLINE TYPE | EMBODIMENT 2 | BB | BB | CC | BB | BB | BB | BB | EXAMPLE 8 |
| 9 | PARTITION WALL STRUCTURE | POROUS MATERIAL | 2.0 | 5 | 0.1 | 1 | NONE | NONE | STRIPLINE TYPE | EMBODIMENT 2 | BB | BB | BB | BB | BB | BB | BB | EXAMPLE 9 |
| 10 | PARTITION WALL STRUCTURE | | 2.0 | 100 | 1 | 1 | NONE | NONE | STRIPLINE TYPE | EMBODIMENT 2 | BB | BB | BB | BB | BB | BB | BB | EXAMPLE 10 |
| 11 | PARTITION WALL STRUCTURE | | 2.0 | 100 | 3 | 1 | NONE | NONE | STRIPLINE TYPE | EMBODIMENT 2 | BB | BB | BB | BB | BB | BB | BB | EXAMPLE 11 |
| 12 | PARTITION WALL STRUCTURE | | 2.0 | 100 | 5 | 1 | NONE | NONE | STRIPLINE TYPE | EMBODIMENT 2 | BB | BB | BB | BB | BB | CC | BB | EXAMPLE 12 |
| 13 | PARTITION WALL STRUCTURE | | 2.0 | 100 | 0.1 | 0.5 | NONE | NONE | STRIPLINE TYPE | EMBODIMENT 2 | BB | BB | BB | BB | BB | BB | BB | EXAMPLE 13 |
| 14 | PARTITION WALL STRUCTURE | | 2.0 | 100 | 0.1 | 0.3 | NONE | NONE | STRIPLINE TYPE | EMBODIMENT 2 | BB | BB | BB | BB | BB | CC | BB | EXAMPLE 14 |
| 15 | PARTITION WALL STRUCTURE | | 2.0 | 100 | 1 | 1 | PRESENT | NONE | STRIPLINE TYPE | EMBODIMENT 10 | BB | BB | BB | BB | BB | BB | AA | EXAMPLE 15 |
| 16 | PARTITION WALL STRUCTURE | | 2.0 | 100 | 0.1 | 1 | NONE | PRESENT | STRIPLINE TYPE | EMBODIMENT 17 | BB | BB | BB | BB | BB | BB | BB | EXAMPLE 16 |
| 17 | PARTITION WALL STRUCTURE | | 2.5 | 100 | 0.1 | 1 | NONE | NONE | COPLANAR TYPE | EMBODIMENT 2 | AA | AA | AA | AA | AA | BB | BB | EXAMPLE 17 |
| 18 | PARTITION WALL STRUCTURE | | 2.0 | 100 | 0.1 | — | NONE | NONE | STRIPLINE TYPE | EMBODIMENT 2 | BB | BB | BB | BB | BB | BB | BB | EXAMPLE 18 |
| 19 | PARTITION WALL STRUCTURE | NON-WOVEN FABRIC | 2.0 | 100 | 0.1 | 1 | NONE | NONE | COPLANAR TYPE | EMBODIMENT 2 | AA | AA | AA | AA | AA | BB | BB | EXAMPLE 19 |
| 20 | PARTITION WALL STRUCTURE | METAL DISPERSION DIELECTRIC | 2.0 | 100 | 0.1 | — | NONE | NONE | COPLANAR TYPE | EMBODIMENT 2 | AA | AA | AA | AA | AA | BB | BB | EXAMPLE 20 |
| 21 | PARTITION WALL STRUCTURE | METAL DISPERSION DIELECTRIC | 0.8 | 10 | 0.1 | 1 | NONE | NONE | STRIPLINE TYPE | EMBODIMENT 2 | AA | AA | AA | AA | AA | BB | BB | EXAMPLE 21 |
| 22 | PARTITION WALL STRUCTURE | METAL DISPERSION DIELECTRIC | 0.5 | 10 | 0.1 | 1 | NONE | NONE | STRIPLINE TYPE | EMBODIMENT 2 | AA | AA | BB | AA | AA | BB | BB | EXAMPLE 22 |
| 23 | PARTITION WALL STRUCTURE | METAL DISPERSION DIELECTRIC | 0.5 | 5 | 0.1 | 1 | NONE | NONE | STRIPLINE TYPE | EMBODIMENT 2 | AA | AA | AA | AA | AA | BB | BB | EXAMPLE 23 |
| 24 | PARTITION WALL STRUCTURE | Air | 0.0 | 10 | 0.1 | 1 | NONE | NONE | STRIPLINE TYPE | EMBODIMENT 2 | BB | BB | AA | AA | AA | BB | BB | EXAMPLE 24 |
| 25 | PARTITION WALL STRUCTURE | Air | 1.0 | 100 | 0.1 | 1 | NONE | NONE | COPLANAR TYPE | EMBODIMENT 19 | AA | AA | AA | AA | AA | BB | BB | EXAMPLE 25 |
| 26 | PILLAR STRUCTURE | Air | 1.0 | 100 | 0.1 | 1 | NONE | NONE | COPLANAR TYPE | EMBODIMENT 20 | BB | BB | BB | AA | BB | BB | BB | EXAMPLE 26 |
| 27 | PILLAR STRUCTURE | Air | 1.0 | 100 | 0.1 | — | NONE | NONE | STRIPLINE TYPE | EMBODIMENT 19 | BB | BB | BB | AA | BB | BB | BB | EXAMPLE 27 |
| 28 | NONE | NONE | — | — | 0.1 | 1 | NONE | NONE | STRIPLINE TYPE | COMPARATIVE EMBODIMENT 1 | DD | DD | DD | DD | DD | CC | CC | *1 |
| 29 | NONE | NONE | — | — | 0.1 | — | NONE | NONE | COPLANAR TYPE | COMPARATIVE EMBODIMENT 1 | DD | DD | DD | DD | DD | CC | CC | *2 |

*1 COMPARATIVE EXAMPLE
*2 COMPARATIVE EXAMPLE

CONTACTLESSLY READABLE TAG, METHOD FOR MANUFACTURING CONTACTLESSLY READABLE TAG, IDENTIFICATION DEVICE, AND IDENTIFICATION INFORMATION DETERMINATION SYSTEM

The present U.S. Patent Application is a U.S. National Phase Application under 35 U.S.C. 371 of International Application PCT/JP2019/022278 filed on Jun. 5, 2019, which claims priority to Japanese Patent Application No. 2018-111011 filed on Jun. 11, 2018, the entire disclosures of which are incorporated herein by reference in their entireties.

TECHNICAL FIELD

The present invention relates to a contactessly readable tag, a method for manufacturing the contactlessly readable tag, an identification device, and an identification information determination system.

BACKGROUND ART

Conventionally a barcode is known as an example of a tag that links an item and information about it. Since barcodes are inexpensive, they are now printed on various items and are widely used as a means of digitizing information about the items. While barcode tags are widely used, it is necessary to bring a barcode reader close to a position of several centimeters from the barcode in order to read the printed contents correctly. An operator feels such a reading operation is complicated. Furthermore, there is a problem that the printed contents cannot be read when the portion on which the barcode is printed is dirty. Furthermore, there is a problem that barcode can be easily rewritten by a malicious person because it is printed at a visible position on the surface of an item.

An electronic tag called RFID is known as a tag that can solve the above problems (see, for example, Patent Document 1). According to an RFID tag, the contents of the tag can be read by using an RFID reader even if the distance is several tens of centimeters to several meters and even if there is some dirt on the tag. Therefore, the burden on the reading operator is significantly reduced as compared with the case of using the barcode. On the other hand, in the conventional technology an IC chip that is vulnerable to static electricity and vibration is used as an RFID tag. As a result, there is a problem that the recorded contents changes during the commodity distribution process or the like, or that a circuit is broken and cannot be read.

As an alternative technology to them, so-called chipless RFID, in which a tag is manufactured without using an IC chip, has begun to attract attention. In an example of the chipless RFID method, a tag in which metal ink is patterned on a substrate made of paper, resin, or the like is irradiated with an electromagnetic wave from a reading device, and the reading device receives and analyzes the reflected wave by the tag corresponding to the resonance frequency derived from the metal pattern of the tag to read the pattern shape of the tag and thus the identification information (see, for example, Non-Patent Document 1). According to such chipless RFID, it is possible to solve the problem that the IC chip is damaged by static electricity or vibration, which is peculiar to the RFID on which an IC chip is mounted. Furthermore, there is an advantage that the tag can be produced on-demand because the metal pattern is formed by a printing method using metal ink or the like.

CITATION LIST

Patent Literature

[Patent Document 1] JP 2016-207011 A

Non-Patent Literature

[Non-Patent Document 1] Chipless RFID based on RF Encoding Particle, 2016

SUMMARY OF INVENTION

Technical Problem

However, the above chipless RFID utilizing resonance phenomenon has insufficient directivity of the emitted electromagnetic wave, has low efficiency of the resonance phenomenon caused by the metal pattern, and has a weak signal strength when having a small size (for example, a square of about 4 cm). Therefore, the chipless RFID has a disadvantage that it is difficult to apply the chipless RFID to applications that require reading over a long distance of about 1 m (for example, ID for commodity distribution or ID for manufacturing steps).

An object of the present invention is to provide a contactlessly readable tag, a method for manufacturing the contactlessly readable tag, an identification device, and an identification information determination system capable of achieving both miniaturization of the tag size and ensuring long-distance readability.

Solution to Problem

In order to solve the above problems, the invention provides a contactlessly readable tag including:
a metal pattern layer;
a conductive layer; and
at least one intermediate layer that has a relative permittivity of 0 or more and 2.5 or less and that is provided between the metal pattern layer and the conductive layer, wherein
the metal pattern layer includes a metal part whose arrangement pattern corresponds to identification information,
the identification information is configured to be identified based on information on an electromagnetic wave that is reflected by the contactlessly readable tag in response to irradiation of the contactlessly readable tag with an electromagnetic wave, and
the metal pattern layer is provided closer to a reading surface of the contactlessly readable tag than at least one of the intermediate layer.

The invention provides the contactlessly readable tag, wherein the intermediate layer includes at least one of a porous material, a non-woven fabric, and a metal dispersion dielectric.

The invention provides the contactlessly readable tag, wherein the intermediate layer has a bulkhead structure or a pillar structure.

The invention provides the contactlessly readable tag, wherein the metal pattern layer and the intermediate layer are provided on each of both surfaces of the conductive layer.

The invention provides the contactlessly readable tag, wherein the intermediate layer has a thickness of 5 µm or more.

The invention provides the contactlessly readable tag, further including:

an adhesive layer that attaches the contactlessly readable tag to an attachment target.

The invention provides the contactlessly readable tag, further including:

a protective layer that is provided on a surface of the metal layer and protects the metal pattern layer.

The invention provides the contactlessly readable tag, further including:

an electromagnetic wave absorbing layer between the metal pattern layer and the conductive layer.

The invention provides the contactlessly readable tag, wherein the metal pattern layer has a surface roughness Rz of 3 µm or less.

The invention provides the contactlessly readable tag, wherein the metal pattern layer includes a plurality of electrically insulated metal patterns, and among the metal patterns, adjacent metal patterns are separated from each other by 0.5 mm or more.

The invention provides the contactlessly readable tag, wherein a total thickness of the metal pattern layer, the intermediate layer, and the conductive layer is 1 mm or less.

The invention provides a method of manufacturing a contactlessly readable tag including a metal pattern layer, a conductive layer, and an intermediate layer that has a relative permittivity of 0 or more and 2.5 or less and that is provided between the metal pattern layer and the conductive layer, the method including:

printing in which the metal pattern layer is formed by inkjet printing, by screen printing, by thermal printing, by flexographic printing, or with a dispenser.

The invention provides the method of manufacturing a contactlessly readable tag, further including:

punching in which a part of the metal pattern layer is formed by punching metal foil or by etching metal foil, wherein, in the printing, a part of the metal pattern layer that is not formed in the punching or in the etching is formed by inkjet printing, by screen printing, by thermal printing, by flexographic printing, or with a dispenser.

The invention provides a method of manufacturing a contactlessly readable tag including a metal pattern layer, a conductive layer, and an intermediate layer that has a relative permittivity of 0 or more and 2.5 or less and that is provided between the metal pattern layer and the conductive layer, the method including:

valley-folding in which the metal pattern layer is arranged on each of both surfaces by folding the tag with the conductive layer side being inside.

The invention provides an identification device configured to identify the contactlessly readable tag, including:

an identifier that identifies, based on an amplitude, phase, or frequency of a reflected electromagnetic wave that are reflected by the contactlessly readable tag in response to irradiation of the contactlessly readable tag with an electromagnetic wave, identification information corresponding to an amplitude, phase, or frequency of the electromagnetic wave.

The invention provides an identification information determination system including:

the contactlessly readable tag; and an identification device configured to identify the contactlessly readable tag, wherein the identification device includes an identifier that identifies, based on an amplitude, phase, or frequency of a reflected electromagnetic wave that are reflected by the contactlessly readable tag in response to irradiation of the contactlessly readable tag with an electromagnetic wave, identification information corresponding to an amplitude, phase, or frequency of the electromagnetic wave.

Advantageous Effects of Invention

According to the present invention, it is both possible to reduce the tag size and to assure reading performance over a long distance.

BRIEF DESCRIPTION OF DRAWINGS

FIG. 30 is a diagram showing an example of evaluation results.

DESCRIPTION OF EMBODIMENTS

Figure 1:
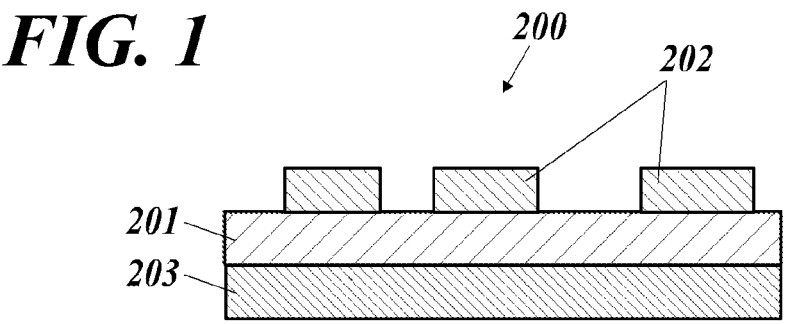
FIG. 1 is a cross-sectional view showing a configuration example of an RFID tag according to the present embodiment.

Hereinafter, embodiments of the present invention will be described in detail with reference to the drawings.

The contactlessly readable tag in the present embodiment is a chipless RFID tag (hereinafter, also simply referred to as a tag) that does not use an IC chip and includes a metal pattern layer, a metal sheet layer (conductive layer), and a buffer layer(s) (intermediate layer(s)) having a relative permittivity of 0 or more and 2.5 or less. The arrangement pattern (installation mode) of the metal part in the metal pattern layer is associated with identification information. In other words, different metal patterns have different identification information. Here, the "metal pattern" means an arrangement (positional relationship, shape, size, etc.) of metal.

When a tag reader irradiates the contactlessly readable tag of the present embodiment with an electromagnetic wave(s) (transmission wave(s)), the identification information carried by the tag is identified based on the reflection features of the electromagnetic wave(s) (reflected wave(s)) reflected by the metal part of the tag. Here, the "reflection features" include an amplitude (the magnitude of the amplitude, the pattern of the magnitude, etc.), and frequency or phase shift (change or deviation) of the reflected electromagnetic wave. For example, carried information is different from each other between a tag with a frequency and phase shift of 0 (first tag), a tag with a frequency shift of 0 and with some phase shift (second tag), and a tag with a frequency shift and with a phase shift of 0, even if their reflected electromagnetic waves have the same amplitude. As described above, in the present embodiment, the magnitude of the amplitude of the electromagnetic wave reflected by the tag and the frequency or phase shift are detected as electromagnetic wave reflection information, and the identification information corresponding to the electromagnetic wave reflection information is determined.

In the present embodiment, a method using resonance (hereinafter referred to as a resonance method) is used as a method of reading the chipless RFID.

In the resonance method, identification information is identified based on difference in resonance frequency. The resonance frequency is determined by the shape (mainly the length) of the metal part that becomes the antenna, which is a component of the chipless RFID. Generally, when the maximum length of such an antenna is ½ of the frequency ($\lambda$) of the transmission wave, the antenna resonates, such that there appears an absorption peak in which the intensity (amplitude) of the reflected wave at a frequency corresponding to the antenna length becomes low. Alternatively, the environment around the antenna such as the combination of the dielectric constant and the thickness of the substrate can be changed such that there appears a reflection peak in which the intensity of the reflected wave conversely increases. In the system using the resonance method, for example, the RFID tags each have respective antennas (metal parts) having different resonance frequencies from each other. In this case, when the tag reader performs frequency sweep of the transmission wave and irradiates the tag with the electromagnetic wave, the identification information corresponding to the spectrum of the reflected wave can be read. In the followings, unless otherwise noted, the resonance method is configured such that an absorption peak appears.

In an example of the present embodiment, a plurality of antennas (metal parts) of a chipless RFID to be used have different resonance frequencies from each other and are arranged in an array. In this case as well, when the tag reader performs the frequency sweep of the transmission wave and irradiates the tag with the electromagnetic wave, the reflected wave corresponding to the number of the antenna can be obtained. Accordingly, in this case, one tag can carry a lot of information.

Embodiment 1

The RFID tag 200 is a chipless contactlessly readable tag that does not use an IC chip.

As shown in FIG. 1, the RFID tag 200 has a buffer layer (intermediate layer) 201 that is a plate substantially rectangular in a plan view and a metal pattern layer 202 that is arranged on a surface (upper surface in the drawing) of the buffer layer 201 in an arrangement pattern corresponding to the identification information. That is, the buffer layer 201 may function as a substrate. A metal sheet layer (conductive layer) 203 is arranged on the lower surface of the buffer layer 201.

The buffer layer 201 is a layer provided between the metal pattern layer 202 and the metal sheet layer 203 and has a relative permittivity of 0 or more and 2.5 or less. By providing the tag 200 with the buffer layer 201 that has a relative permittivity in the above range, the influence of an electromagnetic wave is blocked between the metal pattern layer 202 and the item as an attachment target of the tag 200.

Because there occurs not wavelength shortening effect resulting from the relative permittivity of the target item to which the tag 200 attaches, it is possible to prevent fluctuations in the waveform of the reflected wave depending on the items as attachment targets of the tags 200.

Figure 2:
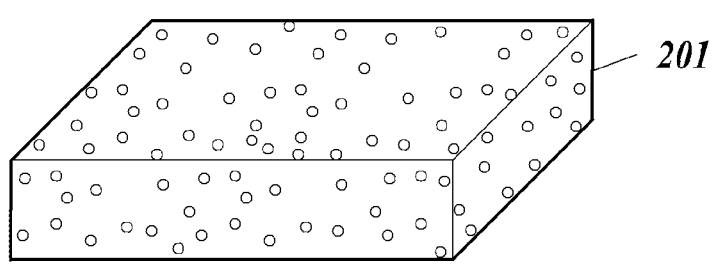
FIG. 2 is a perspective view showing a configuration example of a buffer layer.

The buffer layer 201 is made of a material having a very low relative permittivity of 2.5 or less as described above, such as an air-containing material such as a porous material (foam material or the like) or a non-woven fabric (see FIG. 2). When a porous material or a non-woven fabric is used, they may be used alone or in combination. Alternatively, a porous material or a non-woven fabric may be mixed with a binder such as a resin and used.

The porous material may be an organic substance, an inorganic substance, or a mixture thereof as long as it has a large number of pores and a relative permittivity of 2.5 or less. The size of the pores of the porous material is not limited, but the pore diameter is preferably 10 nm or more and less than 100 μm. More preferably, the pore diameter is 50 nm or more and less than 10 μm. When the pore diameter is within the above preferable range, a layer having a relative permittivity of 2.5 or less can be stably produced, and the thickness of the buffer layer 201 can be reduced.

The organic porous body can be manufactured by any known method such as a dry method and a wet method. The dry method includes a physical method and a chemical method. In a general physical method, a low boiling point liquid (foaming agent) such as chlorofluorocarbons or hydrocarbons is dispersed in a polymer, and then heated to volatilize the foaming agent to form bubbles. In the chemical method, a foaming agent added to resin is thermally decomposed and generates gas that forms cells, thereby a foamed body is obtained. For example, a method has been proposed in which a foamed polyetherimide is obtained by using methylene chloride, chloroform, trichloroethane, or the like as a foaming agent. Furthermore, in recent years, in order to obtain a foamed body having cells that has a small diameter and a high density, a method of form bubbles has been proposed in which a gas such as nitrogen or carbon dioxide is dissolved in a polymer at high pressure, then the pressure is released, and the polymer is heated to the glass transition temperature or near the softening point. In this foaming method, nuclei are formed in a thermodynamically unstable state, and bubbles are formed by expanding and growing the nuclei. This provides an advantage that a fine-porous foamed body that has not been obtained. According to another foaming method, it is also possible to add an additive to a resin component to form a specific micro phase separated structure, and then to remove the additive by solvent extraction based on the difference in solubility of both components in the solvent.

Specific organic porous materials include: general-purpose plastics such as polyethylene, polypropylene, fluororesins, polystyrenes. (meth) acrylic resins, acrylic resins, ABS resins, and AS resins; engineering plastics such as polyamide, polycarbonate, polybutylene terephthalate, polyethylene terephthalate, and cyclic polyolefins; super engineering plastics such as polyphenylene sulfide, polysulfone, polyethersulfone, polyetheretherketone, polyamideimide, polyimide, and polyetherimide; and thermosetting resins such as epoxy resin, phenol resin, melamine resin, urea resin, alkyd resin, unsaturated polyester resin, polyurethane, thermosetting polyimide, silicone resin, and diallyl phthalate resin. One of these resin components may be used alone, or two or more of these resin components may be mixed and used. Among these, when polyurethane. (meth) acrylic resin, acrylic resin, silicone resin, or epoxy resin, which can impart adhesiveness (adhesive function), is used, the buffer layer 201 also has a function as an adhesive layer.

As the inorganic porous material, a polycondensate of a metal alkoxide containing a metalloxane bond (-Metal-Oxygen-Meta-bond) can be used. Specifically, a polycondensate of silicon alkoxide, zirconium alkoxide, titanium alkoxide, or zeolite can be used. The metal alkoxide may be a tetravalent metal alkoxide having no organic chain, a trivalent metal alkoxide having an organic chain, a divalent metal alkoxide, or a monovalent metal alkoxide.

In particular, from the viewpoint that the size of the pore diameter can be controlled and the reaction can be easily controlled, mesoporous silica, which is a porous material made of a polycondensate of silicon alkoxide, is preferable. Ina method of manufacturing mesoporous silica, a surfactant, a silicon alkoxide such as tetraethoxysilane (hereinafter, also referred to as "TEOS"), and an acid or base catalyst are mixed. Then, the silicon alkoxide is reacted by the sol-gel method while the surfactant forms micelles, that is, while the silicon alkoxide is adsorbed around the surfactant. Then, the surfactant is thermally decomposed by calcination of this, and mesoporous silica having uniform pores is obtained. The pore size of mesoporous silica can be easily controlled by changing the alkyl chain length of the surfactant.

A known non-woven fabric can be used as long as fibers are entangled without being woven to contain air and the relative permittivity is 2.5 or less. The non-woven fabric may be an organic substance, an inorganic substance, or a mixture thereof. The non-woven fabric to be used can include, for example, glass fiber, aramid fiber, cellulose fiber, nylon fiber, vinylon fiber, polyester fiber, polyethylene fiber, polypropylene fiber, polyolefin fiber, rayon fiber and the like.

When a non-woven fabric to be used is made of low-density polyethylene resin, ethylene vinyl acetate resin, synthetic rubber, copolymerized polyamide resin, or copolymerized polyester resin, which exerts adhesiveness when heated, the buffer layer 201 also has a function as an adhesive layer.

Figure 3:
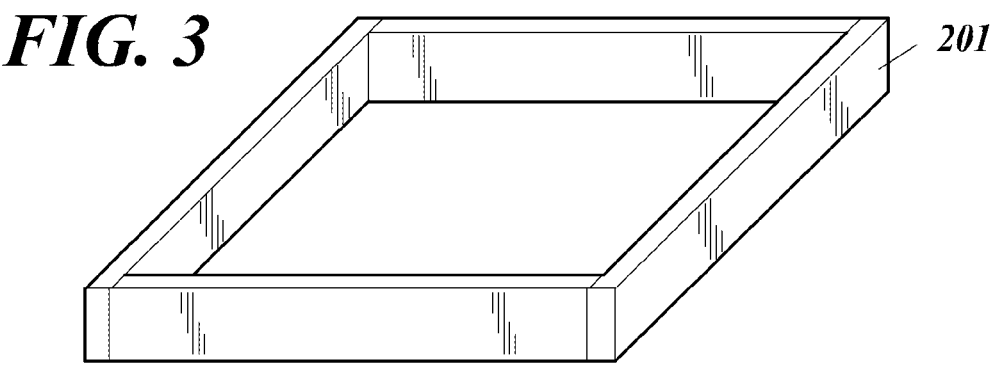
FIG. 3 is a perspective view showing another configuration example of the buffer layer.
Figure 4:
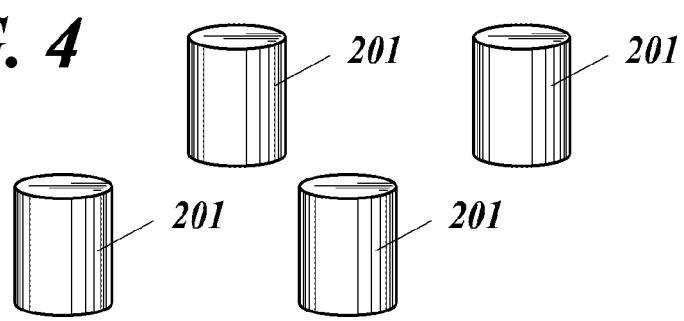
FIG. 4 is a perspective view showing another configuration example of the buffer layer.

In order to have a relative permittivity close to zero, the buffer layer 201 may have a bulkhead structure (see FIG. 3) or a pillar structure (see FIG. 4), so as to form a layer physically filled with air and between the metal pattern layer 202 and the item as the attachment target of the tag 200.

The bulkhead structure may be any structure as long as it can form a physical space between the metal pattern layer 202 and the item as an attachment target of the tag 200. The applicable bulkhead structure has, for example, a frame-like shape. The material forming the bulkhead structure may be an organic substance or an inorganic substance as long as it is a non-conductive dielectric, and various materials such as paper, resin, wood, glass material, and ceramic material can be applied. The above-mentioned porous material or non-woven fabric material can be also used as the bulkhead structure. The buffer layer 201 can have a function as an adhesive layer by forming a bulkhead structure using a porous material or a non-woven fabric material having adhesiveness, or a general-purpose adhesive.

The pillar structure may be any structure as long as a physical space is formed between the metal pattern layer 202 and the item as an attachment target of the tag 200. The applicable pillar structure has, for example, a columnar shape. The material forming the pillar structure may be an organic substance or an inorganic substance as long as it is a non-conductive dielectric, and various materials such as paper, resin, wood, a glass material, and a ceramic material can be applied. The above-mentioned porous material or non-woven fabric material is also able to be used as the pillar structure. The buffer layer 201 is able to function as an adhesive layer by forming a pillar structure by using a porous material or a non-woven fabric material having adhesiveness, or a general-purpose adhesive.

When the buffer layer 201 is formed using a metal-dispersed dielectric (so-called metamaterial), the relative permittivity of the buffer layer 201 can be set not only in the range of 1 to 2.5 but in the range of 0 to 1.

The metal dispersion dielectric of the present invention includes metal particles and a dielectric. The buffer layer 201 having a desired relative permittivity is able to be formed by combining a dielectric having a positive relative permittivity and a metal having a negative relative permittivity such that the metal particles are dispersed in the dielectric.

<Metal Particles>

The metal particles are not particularly limited as long as a metal bond can be formed, and examples thereof include silver, gold, copper, aluminum, platinum, nickel, chromium, tin, zinc, gallium, indium, titanium, and bismuth. The metals may bean alloy or a mixture containing the above metals, or may be partly oxidized. The average particle diameter of the metal particles is not particularly limited, but from the viewpoint of the printing process, it is preferably 3 nm or more and 2 mm or less, and more preferably 15 nm or more and 30 um or less. They may be covered with a substance other than metal particles. An organic substance may be mixed.

<Dielectric>

The dielectric is not particularly limited as long as it has a positive relative permittivity, and may be, for example, organic, inorganic, or an organic-inorganic hybrid. When the dielectric is, for example, an organic substance, a polymer is preferable for the purpose of forming a layer, and examples thereof include the followings: (meta)acrylic resin, urethane resin, polyolefin resin, polyether resin, polyvinyl chloride resin (for example, polyvinyl chloride polymer and vinyl chloride-vinylidene chloride copolymer), epoxy resin, polysiloxane resin, fluororesin, styrene copolymers (for example, styrene-butadiene copolymer, styrene-(meth)acrylic acid ester copolymer, and the like), vinyl acetate copolymer (for example, ethylene-vinyl acetate copolymer, and the like) and the like.

As described above, by forming the buffer layer 201 with the metal dispersion dielectric material so as to set the relative permittivity of the buffer layer 201 in the range of 0 to 1, it is possible to make the buffer layer 201 thin.

The metal pattern layer 202 is provided with a plurality of (three in the drawing) metal parts that extend in the same direction with each other. These metal pattern layer 202 functions as resonance antennas.

In the RFID tag 200, the metal pattern layer 202 is arranged closer to the reading surface (upper surface in the drawing) than the buffer layer 201. As a result, it is possible to block the influence of an electromagnetic wave between the metal pattern layer 202 and the various items as the attachment target to which the tag 200 is attached.

There are various methods that can be used as a method for forming (arranging) the metal pattern layer 202 on the buffer layer 201. In one example of forming method using ink (or toner), the ink (or toner) is patterned on the buffer layer 201 by an inkjet printer (or an electrophotographic printer). Alternatively, the metal pattern layer 202 can be formed using ink (or toner) including silver nanoparticles, for example, and the ink (or toner) is patterned on the buffer layer 201 by an inkjet printer (or an electrophotographic printer). By such a method, the electromagnetic wave (transmission wave) stably reflect in the metal pattern layer 202, and the effect of reducing reading errors of the data formed (stored) on the RFID tag 200 can be obtained. From the viewpoint of responding to a user on demand, it is preferable to pattern (pattern print) the metal pattern layer 202 by using inkjet printing or thermal printing, which is a method of printing on demand. The patterning of the metal pattern layer 202 can be performed not only on the buffer layer 201 but also on various items such as a substrate, a packaging material, a container, and various products.

The metal sheet layer 203 is a layer provided on the lower surface of the buffer layer 201 and formed of a conductive substance.

The material of the metal sheet layer 203 is not particularly limited as long as it has conductivity, and may be, for example, a metal such as silver, gold, copper, or aluminum, a conductive oxide such as ITO, a conductive organic substance such as PANI or CNT, or a mixture containing at least one of these. The above metal may be an alloy or a mixture containing the above metal, or may be partly oxidized. The conductivity is not particularly limited, and is preferably 10 [S/m] or more from the viewpoint of signal strength.

When the buffer layer 201 having a relative permittivity of 0 or more and 2.5 or less is provided between the metal pattern layer 202 and the metal sheet layer 203 as described above, the resonance phenomenon in response to irradiation of the tag 200 with an electromagnetic wave occurs not only in the metal pattern layer 202 but also between the metal pattern layer 202 and the metal sheet layer 203. Because the resonance phenomenon that occurs between the metal pattern layer 202 and the metal sheet layer 203 has an effect of amplifying the resonance phenomenon in the metal pattern layer 202, the signal strength can be increased. Furthermore, because the metal sheet layer 203 has a function as a plate that reflects the electromagnetic wave, the directivity of the tag radiation pattern is improved. That is, when the tag reader irradiates the tag 200 with the electromagnetic wave, the re-radiation of the electromagnetic wave from the tag 200 efficiently returns to the tag reader. As a result, the signal strength can be significantly increased, and it is both possible to reduce the tag size and to assure reading performance over a long distance. Additionally, it is possible to improve the transparent reading performance.

Furthermore, because of the buffer layer 201 having a relative permittivity of 0 or more and 2.5 or less, it is possible to block the influence of an electromagnetic wave between the tag 200 and the item as the attachment target, and then to suppress the change of the reflected wave signal. Therefore, it is possible to read the identification information carried on the tag 200 accurately.

FIG. 1 illustrates a configuration in which three metal parts are used in the metal pattern layer 202. However, any number of metal parts may be used. The metal parts may be partly used as a reference point for position detection.

Next, various configuration examples (Embodiments 2 to 22) of the RFID tag 200 of the present embodiment will be described.

Embodiment 2

Figure 5:
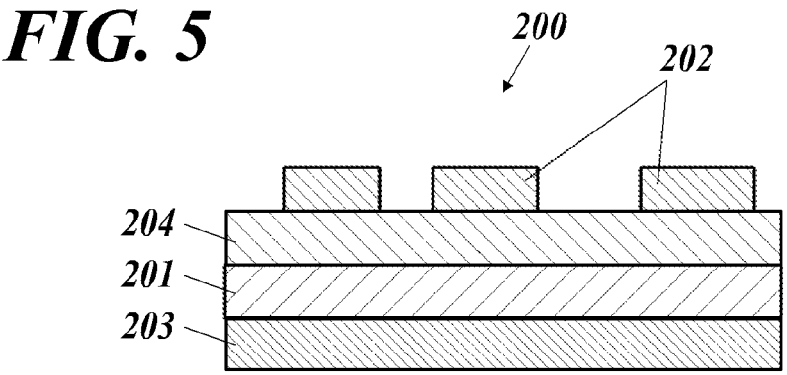
FIG. 5 is a cross-sectional view showing another configuration example of an RFID tag according to the present embodiment.

First, with reference to the cross-sectional view of FIG. 5, another configuration example of the RFID tag 200 according to the present embodiment will be described. In this example, as compared with the example of FIG. 1 (Embodiment 1), a substrate 204 is arranged between the metal pattern layer 202 and the buffer layer 201. That is, in the example shown in FIG. 5, the metal pattern layer 202 is arranged on the upper surface of the substrate 204.

As the substrate 204, a material having electromagnetic wave transmission is used. Examples of such a material include paper and resin. In the various configuration examples illustrated and described below, unless otherwise noted, the substrate 204 is made of a material that transmits an electromagnetic wave (transmission wave).

With such a configuration, the signal strength can be significantly increased, and it is both possible to reduce the tag size and to assure reading performance over a long distance. Additionally, it is possible to improve the transparent reading performance.

Embodiment 3

Figure 6:
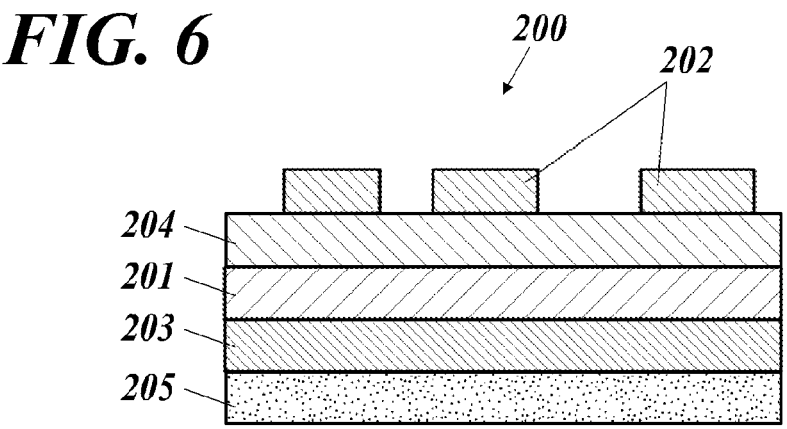
FIG. 6 is a cross-sectional view showing another configuration example of an RFID tag according to the present embodiment.

Next, with reference to the cross-sectional view of FIG. 6, another configuration example of the RFID tag 200 according to the present embodiment will be described. In this example, as compared with the example of FIG. 5 (Embodiment 2), an adhesive layer 205 that attaches the tag to the item as the attachment target is arranged on the lower surface of the metal sheet layer 203.

The adhesive layer 205 is not particularly limited as long as it is an adhesive layer that can attach the tag 200 to the item as the attachment target. As the adhesive layer 205, for example, a dry laminating agent, a wet laminating agent, an adhesive, a heat sealing agent, a hot melting agent, or the like can be used. Alternatively, as the adhesive layer 205, for example, a polyester resin, a urethane resin, a polyvinyl acetate resin, an acrylic resin, a nitrile rubber, or the like may be used. The thickness of the adhesive layer is usually preferably in the range of about 1 to 50 μm from the viewpoint of adhesive effect, drying speed, and the like. Materials specifically used for the adhesive layer preferably include, for example, adhesives such as "SK Dyne Series" manufactured by Soken Chemical Co., Ltd., "Oribain BPW series" and "BPS series" manufactured by Toyo Ink Co., Ltd., and "Arcon", "Super Ester", and "Hyper" manufactured by Arakawa Chemical Co., Ltd.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided, the tag 200 can be easily attached to the item as the attachment target.

Embodiment 4

Figure 7:
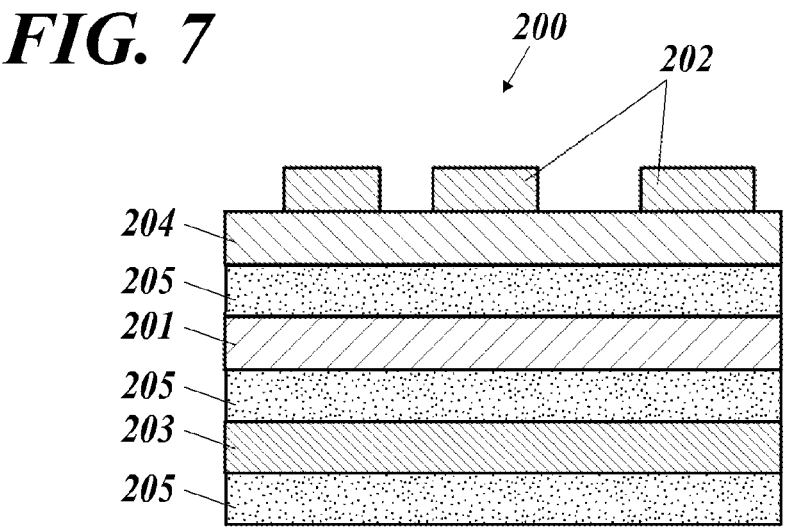
FIG. 7 is a cross-sectional view showing another configuration example of an RFID tag according to the present embodiment.

Next, with reference to the cross-sectional view of FIG. 7, another configuration example of the RFID tag 200 according to the present embodiment will be described. In this example, as compared with the example of FIG. 6 (Embodiment 3), adhesive layers 205 are each arranged between the substrate 204 and the buffer layer 201 and between the buffer layer 201 and the metal sheet layer 203. That is, the adhesive layer 205 is used not only for sticking to the item as the attachment target but also for sticking respective layers together. Therefore, in the present embodiment, the attachment target includes not only the item but also respective layers.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided on the lower surface of the metal sheet layer 203, the tag 200 can be easily attached to the item as the attachment target.

Furthermore, since the adhesive layers 205 are each arranged between the substrate 204 and the buffer layer 201 and between the buffer layer 201 and the metal sheet layer 203, it is possible to easily stick the substrate 204 and the buffer layer 201 together and the buffer layer 201 and the metal sheet layer 203 together.

Embodiment 5

Figure 8:
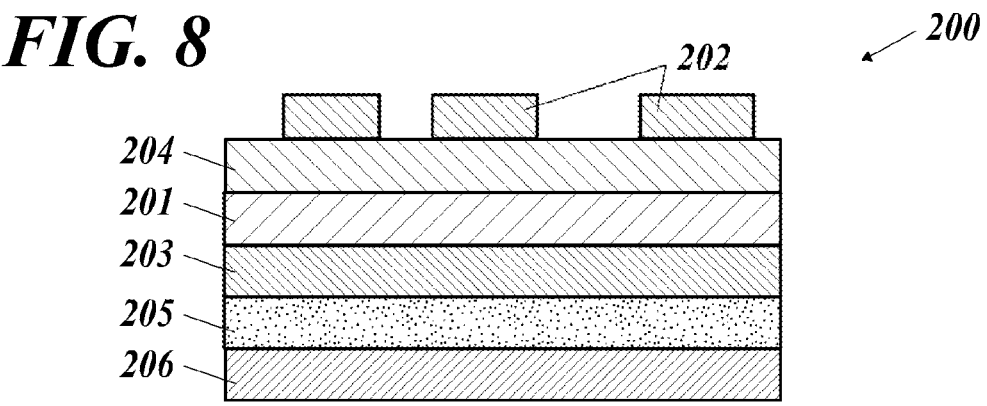
FIG. 8 is a cross-sectional view showing another configuration example of an RFID tag according to the present embodiment.

Next, with reference to the cross-sectional view of FIG. 8, another configuration example of the RFID tag 200 according to the present embodiment will be described. In this example, as compared with the example of FIG. 6 (Embodiment 3), a release sheet layer 206 that ensures the adhesive strength of the adhesive layer 205 is arranged on the lower surface of the adhesive layer 205.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided on the lower surface of the metal sheet layer 203 the tag 200 can be easily attached to the item as the attachment target.

Furthermore, since the release sheet layer 206 is provided on the lower surface of the adhesive layer 205, it is possible to ensure the adhesive strength of the adhesive layer 205.

Embodiment 6

Figure 9:
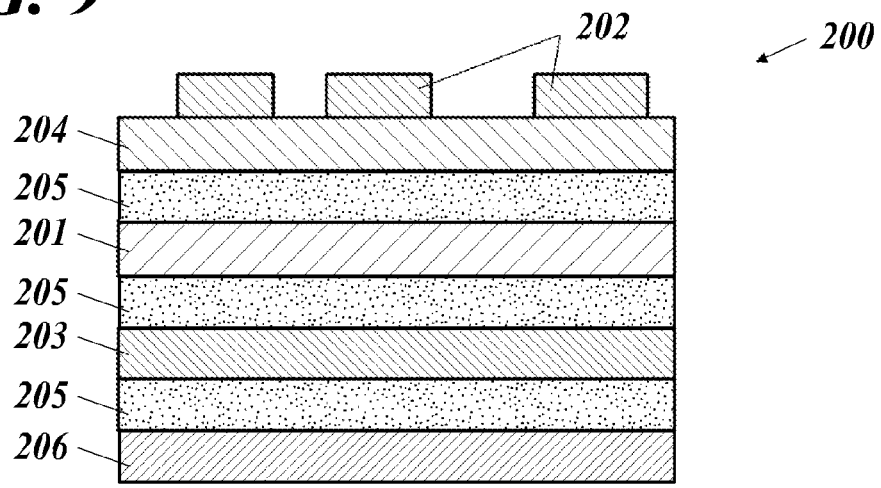
FIG. 9 is a cross-sectional view showing another configuration example of an RFID tag according to the present embodiment.

Next, with reference to the cross-sectional view of FIG. 9, another configuration example of the RFID tag 200 according to the present embodiment will be described. In this example, as compared with the example of FIG. 7 (Embodiment 4), a release sheet layer 206 is arranged on the lower surface of the adhesive layer 205 arranged at the bottom (the adhesive layer 205 having an exposed bottom surface).

With such a configuration, the signal strength can be significantly increased, and it is both possible to reduce the tag size and to assure reading performance over a long distance. Additionally, it is possible to improve the transparent reading performance.

Furthermore, since the adhesive layers 205 is provided on the lower surface of the metal sheet layer 203, the tag 200 can be easily attached to the item as the attachment target.

Furthermore, since the adhesive layers 205 are each provided between the substrate 204 and the buffer layer 201 and between the buffer layer 201 and the metal sheet layer 203, it is possible to easily stick the substrate 204 and the buffer layer 201 together and the buffer layer 201 and the metal sheet layer 203 together.

Furthermore, since the release sheet layer 206 is provided on the lower surface of the adhesive layer 205 arranged at the bottom, it is possible to ensure the adhesive strength of the adhesive layer 205 arranged at the bottom.

Embodiment 7

Figure 10:
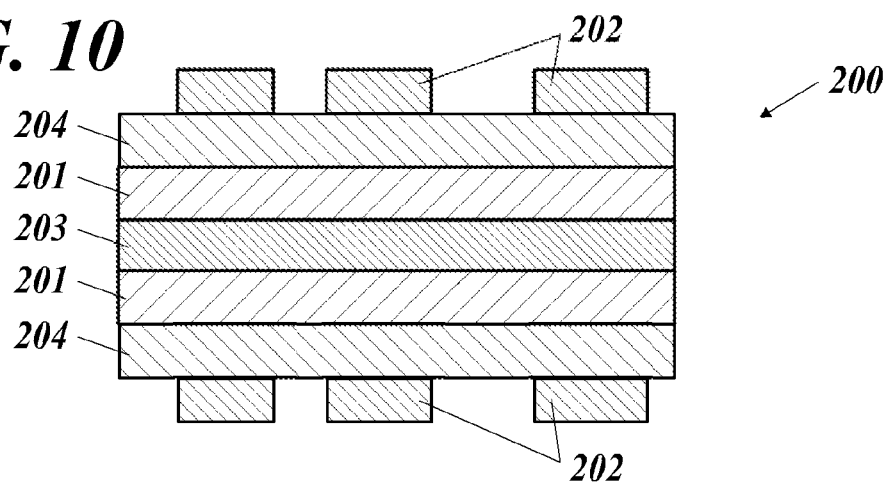
FIG. 10 is a cross-sectional view showing another configuration example of an RFID tag according to the present embodiment.

Next, with reference to the cross-sectional view of FIG. 10, another configuration example of the RFID tag 200 according to the present embodiment will be described. In this example, as compared with the example of FIG. 5 (Embodiment 2), a buffer layer 201, a substrate 204, and a metal pattern layer 202 are arranged on the lower surface side of the metal sheet layer 203. That is, in the example shown in FIG. 10, the buffer layer 201, the substrate 204, and the metal pattern layer 202 are arranged on each of both surface sides of the metal sheet layer 203.

With such a configuration, the signal strength can be significantly increased, and it is both possible to reduce the tag size and to assure reading performance over a long distance. Additionally, it is possible to improve the transparent reading performance.

Furthermore, since the buffer layer 201, the substrate 204, and the metal pattern layer 202 are arranged on each of the both surfaces of the metal sheet layer 203, identification information can be read from either surface side.

Embodiment 8

Figure 11:
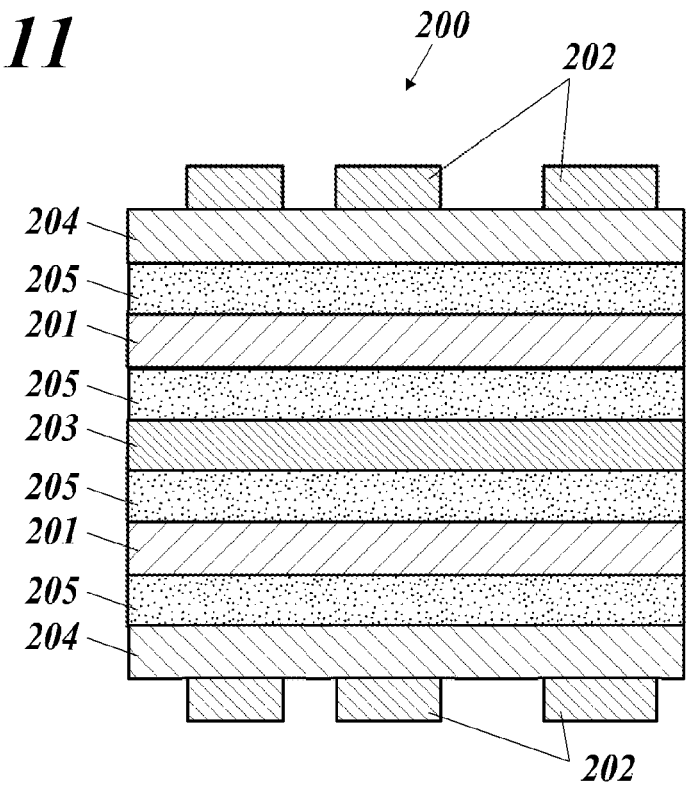
FIG. 11 is a cross-sectional view showing another configuration example of an RFID tag according to the present embodiment.

Next, with reference to the cross-sectional view of FIG. 11, another configuration example of the RFID tag 200 according to the present embodiment will be described. In this example, as compared with the example of FIG. 10 (Embodiment 7), the adhesive layer 205 is arranged between the substrate 204 and the buffer layer 201, and between the buffer layer 201 and the metal sheet layer 203, respectively.

With such a configuration, the signal strength can be significantly increased, and it is both possible to reduce the tag size and to assure reading performance over a long distance. Additionally, it is possible to improve the transparent reading performance.

Furthermore, since the buffer layer 201, the substrate 204, and the metal pattern layer 202 are arranged on each of the both surfaces of the metal sheet layer 203, identification information can be read from either surface side.

Furthermore, since the adhesive layers 205 are each provided between the substrate 204 and the buffer layer 201 and between the buffer layer 201 and the metal sheet layer 203, it is possible to easily stick the substrate 204 and the buffer layer 201 together and the buffer layer 201 and the metal sheet layer 203 together.

Embodiment 9

Figure 12:
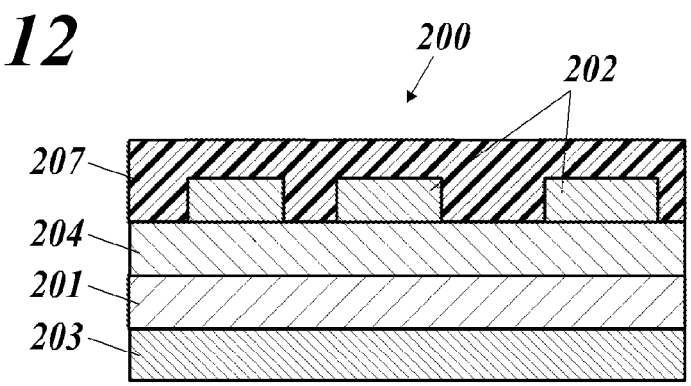
FIG. 12 is a cross-sectional view showing another configuration example of an RFID tag according to the present embodiment.

Next, with reference to the cross-sectional view of FIG. 12, another configuration example of the RFID tag 200 according to the present embodiment will be described. In this example, as compared with the example of FIG. 5 (Embodiment 2), a protection layer 207 is arranged so as to cover the metal pattern layer 202 (all of the plurality of metal parts) from the upper surface side of the metal pattern layer 202.

The protection layer 207 is a layer provided on the upper surface of the metal pattern layer 202 and protects the metal pattern layer 202.

The protection layer 207 may be of any material as long as it can transmit the electromagnetic wave and suppress wear of the metal pattern. For example, the protection layer 207 can be formed by UV curing or thermosetting using the following materials: acrylic resin, urethane resin, melamine resin, epoxy resin, organic silicate compound, silicone resin, polyesters such as polyethylene terephthalate (PET), polyethylene, polyethylene naphthalate (PEN), polyethylene, polypropylene, cellophane, cellulose esters such as cellulose diacetate, cellulose triacetate (TAC), cellulose acetate butyrate, cellulose acetate propionate (CAP), cellulose acetate phthalate, cellulose nitrate, or derivatives thereof, polyvinylidene chloride, polyvinyl alcohol, polyethylene vinyl alcohol, syndiotactic polystyrene, polycarbonate, norbornene resin, polymethylpentene, polyetherketone, polyimide, polyethersulfone (PES), polysulfones, polyetherketoneimide, polyamide, fluororesin, nylon, polymethylmethacrylate, acrylic or polyarylates, cycloolefin resins such as Anon (trade name, manufactured by JSR) or Apel (trade name, manufactured by Mitsui Chemicals), and the like.

The protection layer 207 may be a porous material, a non-woven fabric, or a material containing a metal dispersion dielectric having a relative permittivity of 0 or more and 2.5 or less, similar to the buffer layer 201. When the material forming the protection layer 207 is the same as the material forming the buffer layer 201, it is possible to avoid the harmful effects of resonance frequency shift due to the wavelength shortening effect that occurs when some item with relative permittivity contacts or shields the metal pattern layer 202.

With such a configuration, the signal strength can be significantly increased, and it is both possible to reduce the tag size and to assure reading performance over a long distance. Additionally, it is possible to improve the transparent reading performance.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 10

Figure 13:
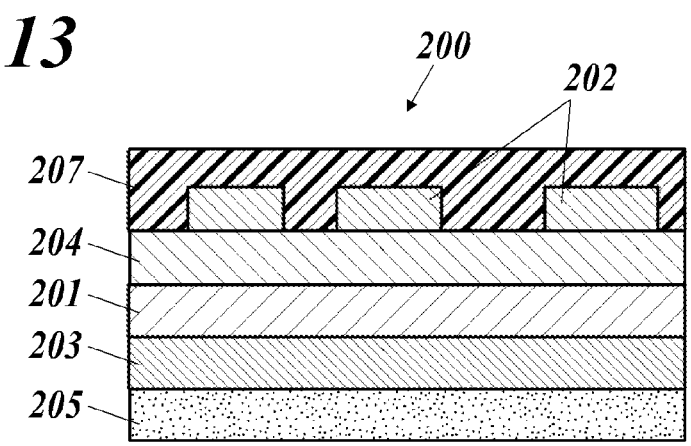
FIG. 13 is a cross-sectional view showing another configuration example of an RFID tag according to the present embodiment.

Next, with reference to the cross-sectional view of FIG. 13, another configuration example of the RFID tag 200 according to the present embodiment will be described. In this example, as compared with the example of FIG. 6 (Embodiment 3), a protection layer 207 is arranged so as to cover the metal pattern layer 202 (all of the plurality of metal parts) from the upper surface side of the metal pattern layer 202.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided, the tag 200 can be easily attached to the item as the attachment target.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 11

Figure 14:
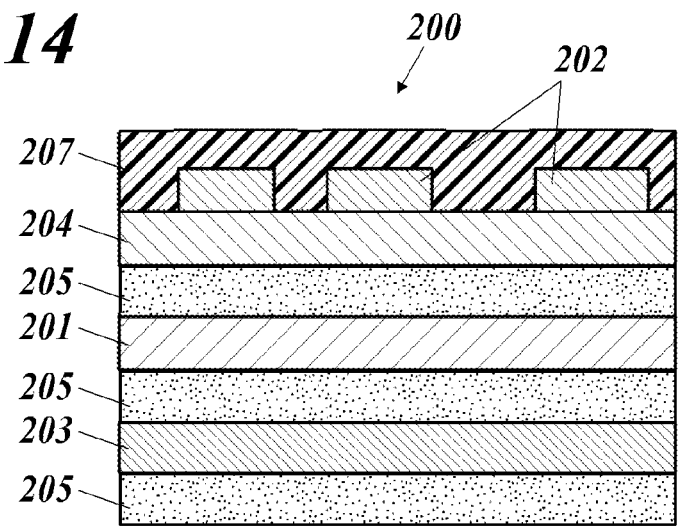
FIG. 14 is a cross-sectional view showing another configuration example of an RFID tag according to the present embodiment.

Next, with reference to the cross-sectional view of FIG. 14, another configuration example of the RFID tag 200 according to the present embodiment will be described. In this example, as compared with the example of FIG. 7 (Embodiment 4), a protection layer 207 is arranged so as to cover the metal pattern layer 202 (all of the plurality of metal parts) from the upper surface side of the metal pattern layer 202.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided on the lower surface of the metal sheet layer 203 the tag 200 can be easily attached to the item as the attachment target.

Furthermore, since the adhesive layers 205 are each arranged between the substrate 204 and the buffer layer 201 and between the buffer layer 201 and the metal sheet layer 203, it is possible to easily stick the substrate 204 and the buffer layer 201 together and the buffer layer 201 and the metal sheet layer 203 together.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 12

Figure 15:
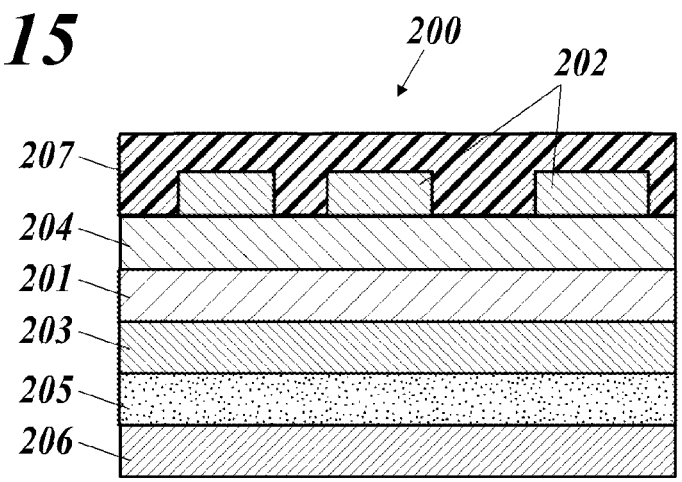
FIG. 15 is a cross-sectional view showing another configuration example of an RFID tag according to the present embodiment.

Next, with reference to the cross-sectional view of FIG. 15, another configuration example of the RFID tag 200 according to the present embodiment will be described. In this example, as compared with the example of FIG. 8 (Embodiment 5), a protection layer 207 is arranged so as to cover the metal pattern layer 202 (all of the plurality of metal parts) from the upper surface side of the metal pattern layer 202.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided on the lower surface of the metal sheet layer 203, the tag 200 can be easily attached to the item as the attachment target.

Furthermore, since the release sheet layer 206 is provided on the lower surface of the adhesive layer 205, it is possible to ensure the adhesive strength of the adhesive layer 205.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 13

Figure 16:
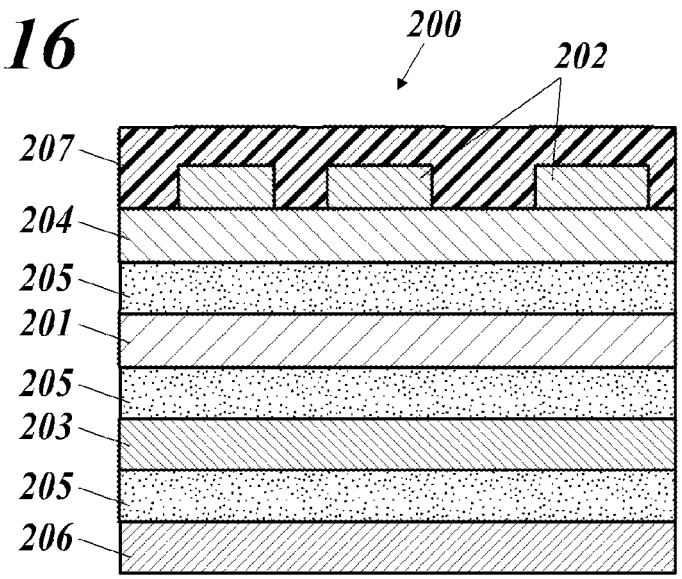
FIG. 16 is a cross-sectional view showing another configuration example of an RFID tag according to the present embodiment.

Next, with reference to the cross-sectional view of FIG. 16, another configuration example of the RFID tag 200 according to the present embodiment will be described. In this example, as compared with the example of FIG. 9 (Embodiment 6), a protection layer 207 is arranged so as to cover the metal pattern layer 202 (all of the plurality of metal parts) from the upper surface side of the metal pattern layer 202.

With such a configuration, the signal strength can be significantly increased, and it is both possible to reduce the tag size and to assure reading performance over a long distance. Additionally, it is possible to improve the transparent reading performance.

Furthermore, since the adhesive layer 205 is provided on the lower surface of the metal sheet layer 203, the tag 200 can be easily attached to the item as the attachment target.

Furthermore, since the adhesive layers 205 are each arranged between the substrate 204 and the buffer layer 201 and between the buffer layer 201 and the metal sheet layer 203, it is possible to easily stick the substrate 204 and the buffer layer 201 together and the buffer layer 201 and the metal sheet layer 203 together.

Furthermore, since the release sheet layer 206 is provided on the lower surface of the adhesive layer 205 arranged at the bottom, it is possible to ensure the adhesive strength of the adhesive layer 205 arranged at the bottom.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 14

Figure 17:
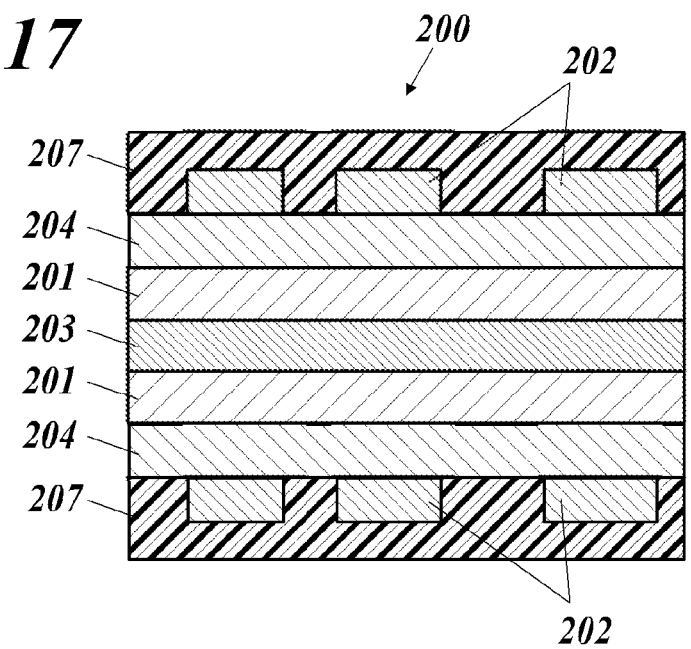
FIG. 17 is a cross-sectional view showing another configuration example of an RFID tag according to the present embodiment.

Next, with reference to the cross-sectional view of FIG. 17, another configuration example of the RFID tag 200 according to the present embodiment will be described. In this example, as compared with the example of FIG. 10 (Embodiment 7), a protection layer 207 is arranged so as to cover the metal pattern layer 202 (all of the plurality of metal parts) from the upper surface side of the metal pattern layer 202 at the top, and another protection layer 207 is arranged so as to cover the metal pattern layer 202 (all of the plurality of metal parts) from the lower surface side of the metal pattern layer 202 at the bottom.

With such a configuration, the signal strength can be significantly increased, and it is both possible to reduce the tag size and to assure reading performance over a long distance. Additionally, it is possible to improve the transparent reading performance.

Furthermore, since the buffer layer 201, the substrate 204, and the metal pattern layer 202 are arranged on each of the both surface sides of the metal sheet layer 203, identification information can be read from either surface side.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 15

Figure 18:
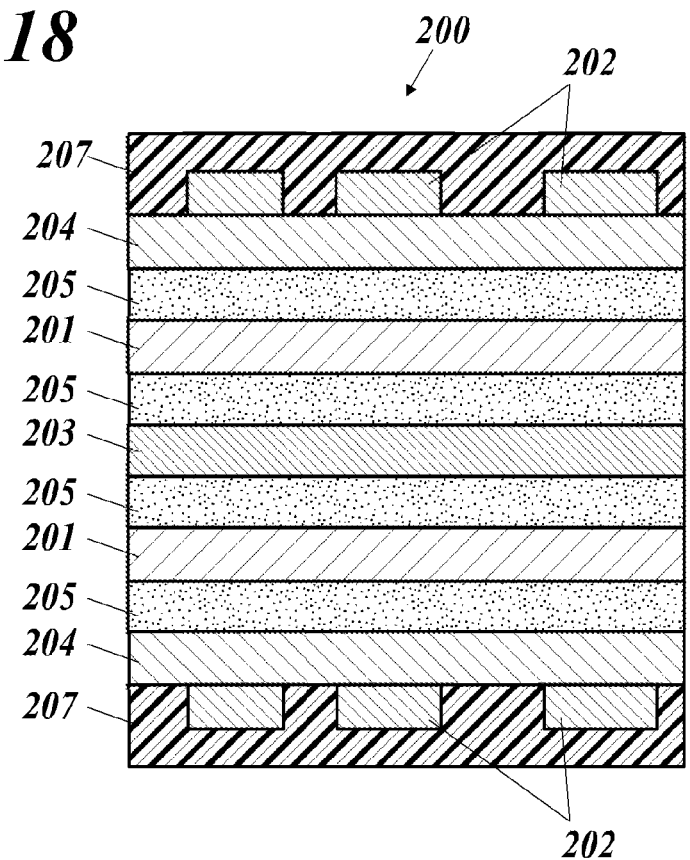
FIG. 18 is a cross-sectional view showing another configuration example of an RFID tag according to the present embodiment.

Next, with reference to the cross-sectional view of FIG. 18, another configuration example of the RFID tag 200 according to the present embodiment will be described. In this example, as compared with the example of FIG. 11 (Embodiment 8), a protection layer 207 is arranged so as to cover the metal pattern layer 202 (all of the plurality of metal parts) from the upper surface side of the metal pattern layer 202 at the top, and another protection layer 207 is arranged so as to cover the metal pattern layer 202 (all of the plurality of metal parts) from the lower surface side of the metal pattern layer 202 at the bottom.

With such a configuration, the signal strength can be significantly increased, and it is both possible to reduce the tag size and to assure reading performance over a long distance. Additionally, it is possible to improve the transparent reading performance.

Furthermore, since the buffer layer 201, the substrate 204, and the metal pattern layer 202 are arranged on each of the both surfaces of the metal sheet layer 203, identification information can be read from either surface side.

Furthermore, since the adhesive layers 205 are each arranged between the substrate 204 and the buffer layer 201 and between the buffer layer 201 and the metal sheet layer 203, it is possible to easily stick the substrate 204 and the buffer layer 201 together and the buffer layer 201 and the metal sheet layer 203 together.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Embodiment 16

Figure 19:
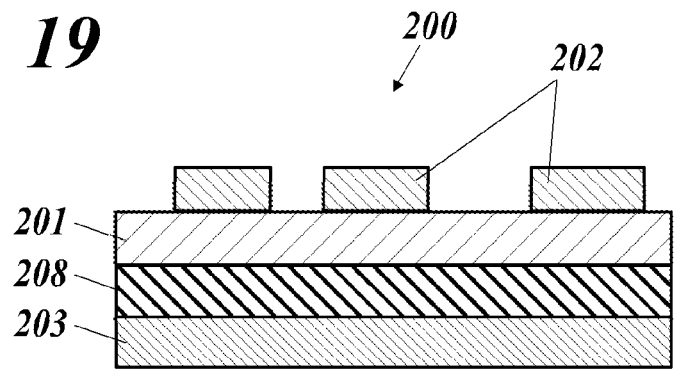
FIG. 19 is a cross-sectional view showing another configuration example of an RFID tag according to the present embodiment.

First, with reference to the cross-sectional view of FIG. 19, another configuration example of the RFID tag 200 according to the present embodiment will be described. In this example, as compared with the example of FIG. 1 (Embodiment 1), an electromagnetic wave absorbing layer 208 is provided between the buffer layer 201 and the metal sheet layer 203. That is, in the example shown in FIG. 19, the electromagnetic wave absorbing layer 208 is provided between the metal pattern layer 202 and the metal sheet layer 203.

The electromagnetic wave absorbing layer 208 is a layer made of an electromagnetic wave absorber. The electromagnetic wave absorber has a property of converting the emitted electromagnetic wave into heat energy or canceling energy by utilizing the phase of the electromagnetic wave. Types of materials having such properties (radio wave absorbers) can be roughly classified into "a magnetic radio wave absorber" and "a dielectric radio wave absorber." The "magnetic radio wave absorber" is a magnetic material alone or a magnetic material present in a non-metal composition, and absorbs radio waves based on the phenomenon that magnetic moment of the magnetic material (micro magnet) does not change its direction in response to a high frequency external magnetic field (Equivalently becomes electrical resistance). The "magnetic radio wave absorber" can be, for example, a general-purpose magnetic material such as ferrite. The "dielectric radio wave absorber" is a dielectric material in which a resistant material is dispersed in a dielectric material without loss. By irradiating the dielectric material with an electromagnetic wave, an electric current flows inside the dielectric material to generate heat. This conversion of the electromagnetic wave energy into heat energy results in absorption of the radio wave. The "dielectric radio wave absorber" can be, for example, a member in which a resistant material such as carbon black is dispersed in a lossless foaming material made of general-purpose resin such as polyethylene, polyurethane, polystyrene, or polypropylene.

With such a configuration, the signal strength can be significantly increased, and it is both possible to reduce the tag size and to assure reading performance over a long distance. Additionally, it is possible to improve the transparent reading performance.

Furthermore, since the electromagnetic wave absorbing layer 208 is provided, it is possible to perform adjustment of partly absorbing the electric field that occurs between the metal pattern layer 102 and the metal sheet layer 203. According to the configuration of the present invention, a signal is the peak of energy attenuation at a specific frequency derived from the resonance phenomenon, and the electromagnetic wave absorbing layer 208 has an effect of promoting the this energy attenuation at a specific frequency due to resonance. As a result, the signal strength can be increased, and it is both possible to reduce the tag size and to assure reading performance over a long distance. Additionally, it is possible to improve the transparent reading performance.

Embodiment 17

Figure 20:
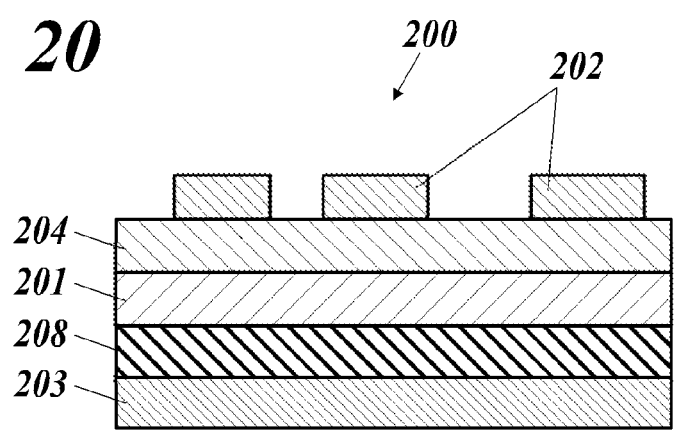
FIG. 20 is a cross-sectional view showing another configuration example of an RFID tag according to the present embodiment.

First, with reference to the cross-sectional view of FIG. 20, another configuration example of the RFID tag 200 according to the present embodiment will be described. In this example, as compared with the example of FIG. 5 (Embodiment 2), an electromagnetic wave absorbing layer 208 is provided between the buffer layer 201 and the metal sheet layer 203.

With such a configuration, the signal strength can be significantly increased, and it is both possible to reduce the tag size and to assure reading performance over a long distance. Additionally, it is possible to improve the transparent reading performance.

Furthermore, since the electromagnetic wave absorbing layer 208 is provided, it is possible to perform adjustment of partly absorbing the electric field that occurs between the metal pattern layer 102 and the metal sheet layer 203. According to the configuration of the present invention, a signal is the peak of energy attenuation at a specific frequency derived from the resonance phenomenon, and the electromagnetic wave absorbing layer 208 has an effect of promoting the this energy attenuation at a specific frequency due to resonance. As a result, the signal strength can be increased, and it is both possible to reduce the tag size and to assure reading performance over a long distance. Additionally, it is possible to improve the transparent reading performance.

Embodiment 18

Figure 21:
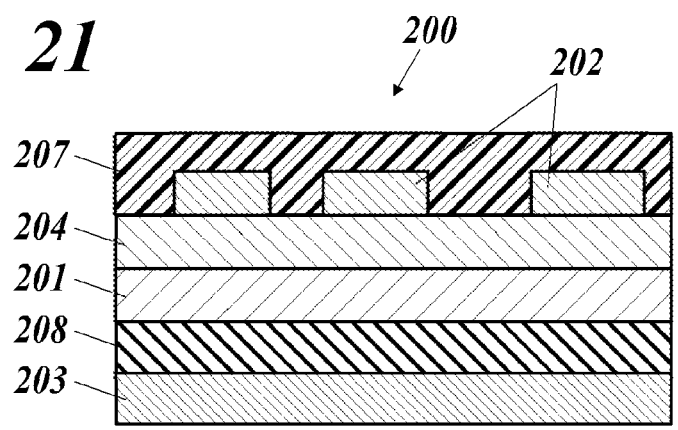
FIG. 21 is a cross-sectional view showing another configuration example of an RFID tag according to the present embodiment.

First, with reference to the cross-sectional view of FIG. 21, another configuration example of the RFID tag 200 according to the present embodiment will be described. In this example, as compared with the example of FIG. 12 (Embodiment 9), an electromagnetic wave absorbing layer 208 is provided between the buffer layer 201 and the metal sheet layer 203.

With such a configuration, the signal strength can be significantly increased, and it is both possible to reduce the tag size and to assure reading performance over a long distance. Additionally, it is possible to improve the transparent reading performance.

Furthermore, it is possible to prevent the metal pattern from being scratched, and the tag 200 can be used with confidence even in an environment where the metal pattern is easily scratched, such as outdoors.

Furthermore, since it is possible to suppress disconnection due to wear of the metal pattern layer 202 and to suppress broadening of the resonance frequency peak of the reflected waveform, the tag 200 has improved durability and can be used for a wider range of purposes.

Furthermore, since the electromagnetic wave absorbing layer 208 is provided, it is possible to perform adjustment of partly absorbing the electric field that occurs between the metal pattern layer 102 and the metal sheet layer 203. According to the configuration of the present invention, a signal is the peak of energy attenuation at a specific frequency derived from the resonance phenomenon, and the electromagnetic wave absorbing layer 208 has an effect of promoting the this energy attenuation at a specific frequency due to resonance. As a result, the signal strength can be increased, and it is both possible to reduce the tag size and to assure reading performance over a long distance. Additionally, it is possible to improve the transparent reading performance.

Embodiment 19

Next, with reference to the plan view of FIG. 22, another configuration example of the RFID tag 200 according to the present embodiment will be described. In this example, as the arrangement pattern of the metal pattern layer 202, a stripline type in which the area of the metal part (black part in the drawing) is relatively small is shown. That is, in the example shown in FIG. 22, a stripline type antenna is adopted as the metal pattern layer 202.

Figure 22:
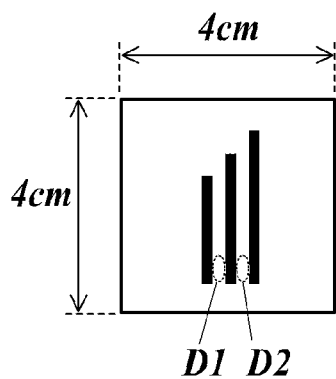
FIG. 22 is a plan view showing another configuration example of an RFID tag according to the present embodiment.

Furthermore, in the example shown in FIG. 22, the metal pattern layer 202 is formed of a plurality of electrically insulated metal patterns, and adjacent metal patterns are configured to be separated from each other by 0.5 mm or more. That is, the distance between adjacent metal patterns (for example, reference numerals D1 and D2 in the drawing) is 0.5 mm or more.

With such a configuration, it is possible to improve detection of the peak of the reflected wave and to read the identification information carried on the tag 200 accurately.

Embodiment 20

Figure 23:
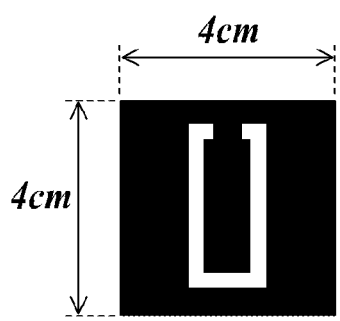
FIG. 23 is a plan view showing another configuration example of an RFID tag according to the present embodiment.

Next, with reference to the plan view of FIG. 23, another configuration example of the RFID tag 200 according to the present embodiment will be described. In this example, as the arrangement pattern of the metal pattern layer 202, a coplanar type in which the area of the metal part (black part in the drawing) is relatively large is shown. That is, in the example shown in FIG. 23, a coplanar type antenna is adopted as the metal pattern layer 202.

With such a configuration, since the entire RFID tag 200 can be shielded by the metal part of the metal pattern layer 202, it is possible to more reliably block the effects of the electromagnetic wave between the tag 200 and the item as the attachment target and to more reliably suppress changes in the reflected wave signal. Therefore, it is possible to read the identification information carried on the tag 200 more accurately.

Embodiment 21

Figure 24:
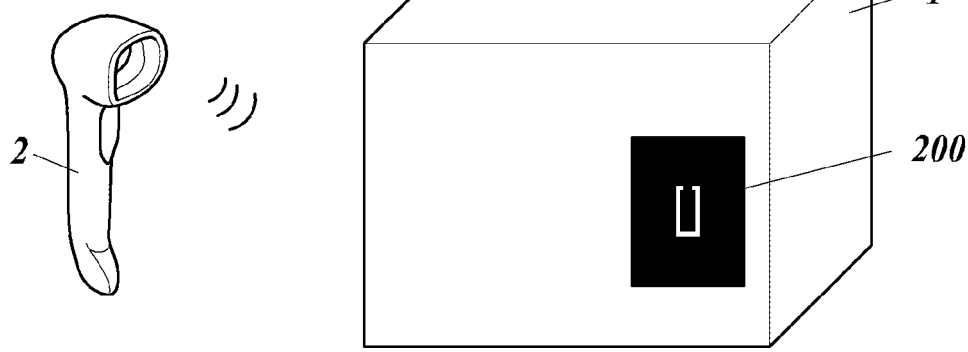
FIG. 24 is a perspective view showing another configuration example of an RFID tag according to the present embodiment.

Next, with reference to the perspective view of FIG. 24, another configuration example of the RFID tag 200 according to the present embodiment will be described. In this example, the RFID tag 200 is stuck on the front surface of the item 1 as the attachment target. In this case, the RFID tag 200 is directly irradiated with the electromagnetic wave emitted from the tag reader 2.

Embodiment 22

Figure 25:
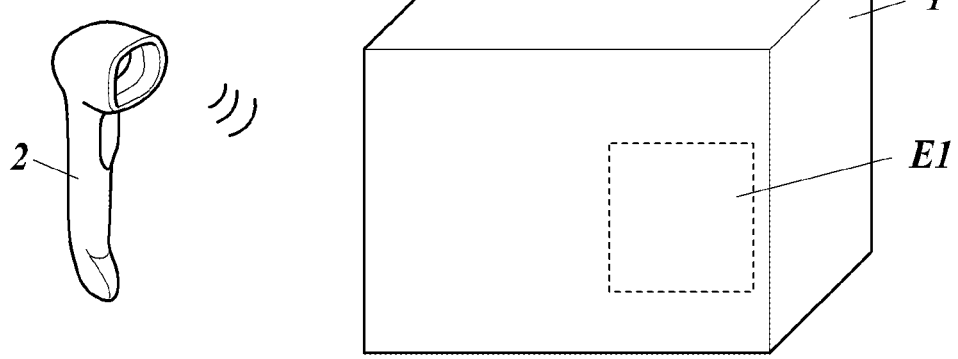
FIG. 25 is a perspective view showing another configuration example of an RFID tag according to the present embodiment.
Figure 26:
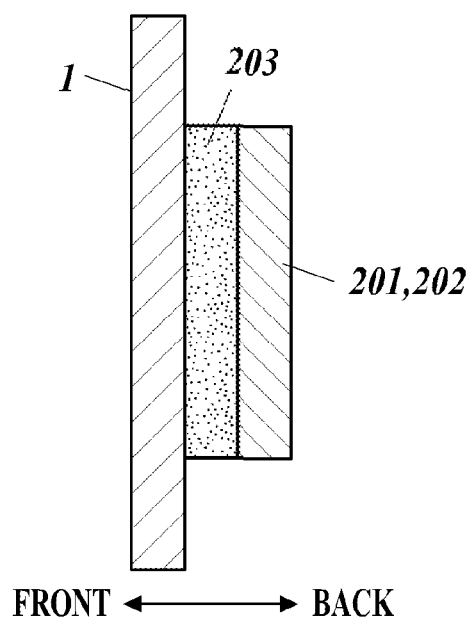
FIG. 26 is a cross-sectional view of the region E1 in FIG. 25.

Next, with reference to the perspective view of FIG. 25 and the cross-sectional view of FIG. 26, another configuration example of the RFID tag 200 according to the present embodiment will be described. FIG. 26 is a cross-sectional view of the region E1 in FIG. 25. In this example, the RFID tag 200 is stuck on the back surface of item 1 as the attachment target. In this case, the RFID tag 200 is irradiated with the electromagnetic wave emitted from the tag reader 2 through the item 1.

With such a configuration, it is possible to block the effects of the electromagnetic wave between the RFID tag 200 and the item 1 as the attachment target and to suppress changes in the reflected wave signal. Therefore, it is possible to read the identification information carried on the tag 200 accurately.

Furthermore, it is possible to effectively use the surface of the item 1 as the attachment target by drawing a package design on the surface of the item 1 as the attachment target, and the like. Furthermore, it is possible to concealed the identification information on the RFID tag 200.

Figure 27:
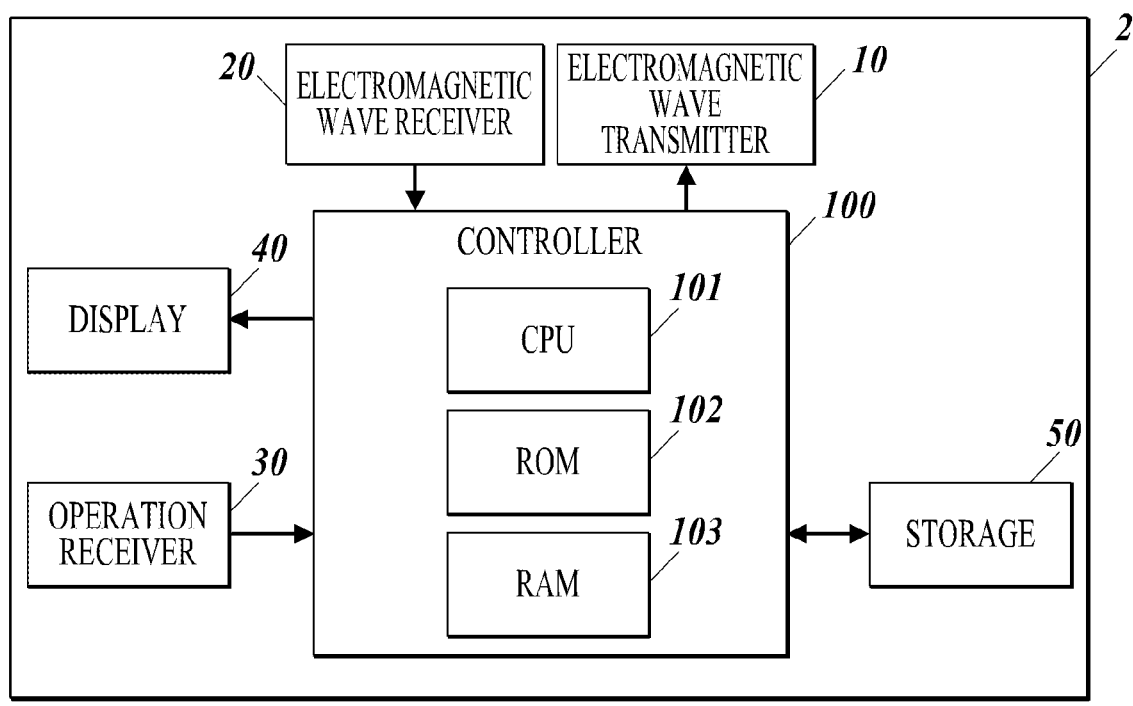
FIG. 27 is a block diagram of a tag reader according to the present embodiment.
Figure 28:
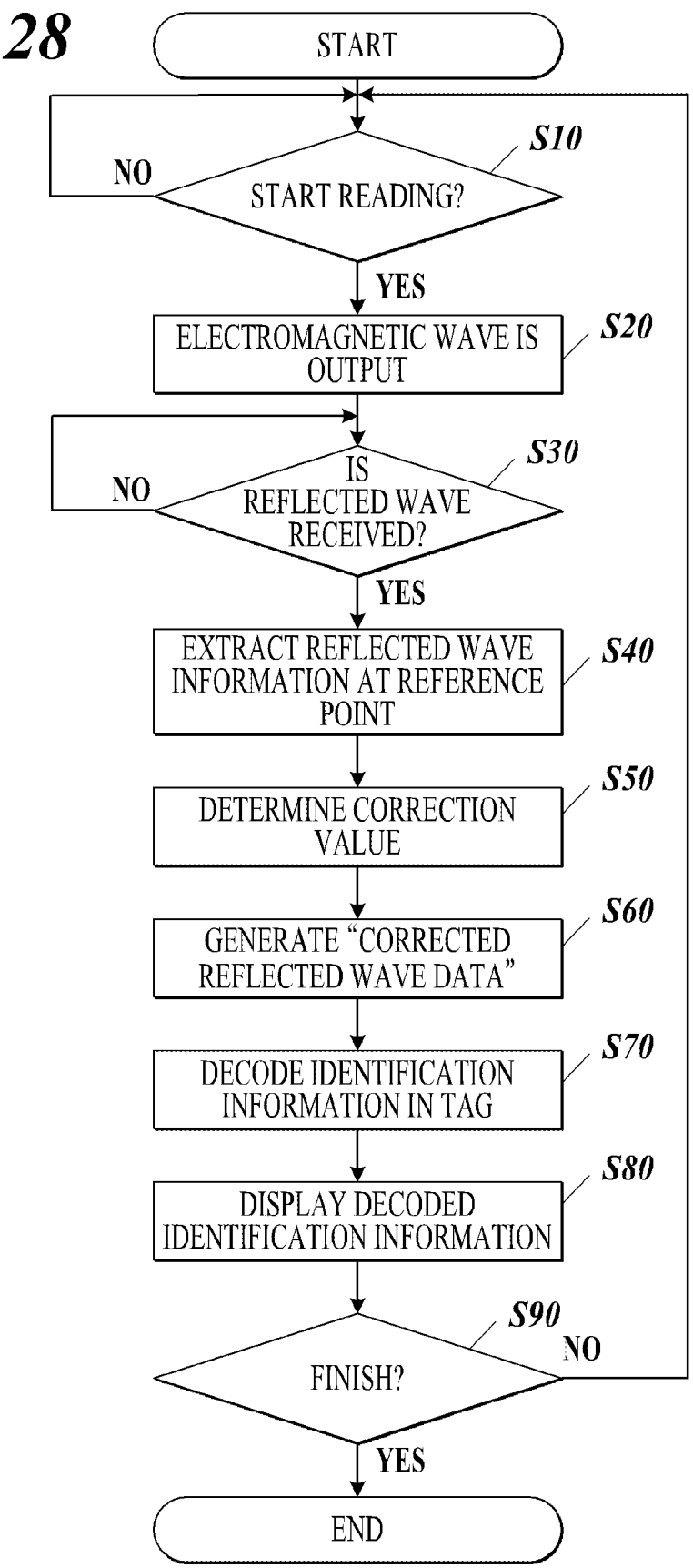
FIG. 28 is a flowchart illustrating processes in which a controller of a tag reader performs reading of a tag.

Next, with reference to FIG. 27 and FIG. 28, the tag reader 2 that reads identification information formed in the RFID tag 200 and the contactlessly readable tag system will be described.

The contactlessly readable tag system of the present embodiment includes the RFID tag 200, which is made by combining the various configurations described above alone or in combination, and the tag reader 2 that identifies the identification information carried on the tag on the basis of the reflection features of the electromagnetic wave reflected by the RFID tag 200.

The tag reader 2 has a function as an identification device that identifies the identification information on the basis of the amplitude and the frequency or phase shift of the electromagnetic wave reflected by the RFID tag 200. As shown in FIG. 27, the tag reader 2 includes an electromagnetic wave transmitter 10, an electromagnetic wave receiver 20, an operation receiver 30, a display 40, a storage 50, a controller 100, and the like.

The electromagnetic wave transmitter 10 is provided with an electronic circuit for generating a radio signal, a transmission antenna, and the like. The electromagnetic wave transmitter 10 transmits the electromagnetic wave having a predetermined frequency in the range of 0.1 GHz to 3 THz (microwave, centimeter wave, millimeter, and far infrared ray).

The electromagnetic wave receiver 20 is provided with a receiving antenna, an electronic circuit, and the like, and receives a reflected wave signal of the electromagnetic wave transmitted by the electromagnetic wave transmitter 10. The electromagnetic wave receiver 20 is provided on the surface of the RFID tag 200 at a position corresponding to the reflection angle of the electromagnetic wave. The electromagnetic wave receiver 20 supplies the received reflected wave signal to the controller 100.

The peak frequency of the reception sensitivity of the electromagnetic wave receiver 20 is the same as the transmission frequency of the electromagnetic wave transmitter 10. In the present system, since reflected waves reflected from the tag have various frequencies (resonant frequencies), the reception sensitivity of the electromagnetic wave receiver 20 corresponds to the frequency band of the reflected wave reflected from the tag. In an example, when the electromagnetic wave receiver 20 performs sweep of the transmission wave and transmit the transmission wave, the controller 100 controls and changes the reception sensitivity of the electromagnetic wave receiver 20 so as to have the same frequency as the transmission frequency after the sweep.

The operation receiver 30 is provided with various switches (operation buttons) such as a power switch for turning on/off the main power supply and an irradiation switch for outputting (emitting) an electromagnetic wave. The operation receiver 30 receives various input operations by the user and outputs an operation signal to the controller 100.

The display 40 is composed of, for example, a liquid crystal display (LCD). Various operation screens and identification information configured on the RFID tag 200 are displayed on the display 40 according to the display control signal input from the controller 100.

The controller 100 is composed of a CPU 101, a ROM 102, a RAM 103, and the like. The CPU 101 reads a program corresponding to the processing content from the ROM 102, loads it in the RAM 103, and controls the operation of each block of the tag reader 2 in cooperation with the loaded program. At this time, various data stored in the storage 50 are referred to. The storage 50 is composed of, for example, a non-volatile semiconductor memory (so-called flash memory) or a hard disk drive.

In the present embodiment, the controller 100 functions as an identifier that identifies identification information on the basis of the amplitude and the frequency or phase shift of the electromagnetic wave reflected by the metal pattern layer 202 of the RFID tag 200. That is, the controller 100 analyzes the signal of the reflected wave that are input from the electromagnetic wave receiver 20, and, on the basis of the analysis results, performs a process of decoding and displaying the identification information configured in the RFID tag 200. More specifically, the controller 100 detects the magnitude of the amplitude of the reflected wave input from the electromagnetic wave receiver 20 and absorption peak or phase shift of the resonance frequency as electromagnetic wave reflection information, and determines the identification information corresponding to the electromagnetic wave reflection information.

Also, the controller 100 controls electromagnetic wave transmitter 10 to output a transmission wave having a reference frequency (for example, 4 GHz), and, at the same time, suitably performs frequency sweep of the transmission wave to identify the a plurality of absorption peaks (resonance frequencies) where the amplitude of the reflected wave input from the electromagnetic wave receiver 20 is the smallest. In identifying such a resonance frequency, the controller 100 can refer to the phase of the reflected wave that is input from the electromagnetic wave receiver 20. Then, the controller 100 decodes the identification information of the tag at the specified plurality of resonance frequencies.

As described above, the controller 100 reads the reflection information of the transmission wave (electromagnetic wave reflection information) based on the features (amplitude, phase, resonance frequency, etc.) of the reflected wave resulting from the electromagnetic wave (transmission wave) with which the RFID tag 200 is irradiated. The controller 100 reads the identification information formed in the tag on the basis of shifts from respective reference values with respect to the phase, resonance frequency, amplitude, etc. that are obtained from the read electromagnetic wave reflection information.

A method of using the tag reader 2 in the present embodiment is now briefly described. According to the tag reader 2, in response to pressing of the irradiation switch after the electromagnetic wave transmitter 10 is directed towards the RFID tag 200, the electromagnetic wave transmitter 10 outputs the transmission wave (electromagnetic wave) having a predetermined frequency and irradiates the RFID tag 200 with them. This electromagnetic wave is reflected by the RFID tag 200 and received by the electromagnetic wave receiver 20. Then, by performing various processes, the identification information formed on the RFID tag 200 is read, and the read identification information is displayed on the display 40.

Hereinafter, with reference to the flowchart of FIG. 28, the flow of processes performed by the controller 100 of the tag reader 2 will be described.

In step S10 after the power is turned on, the controller 100 monitors the input signal from the operation receiver 30, and determines whether or not the irradiation switch (hereinafter, simply referred to as a switch) has been pressed (that is, whether or not the tag reader 2 has started reading). If the controller 100 determines that the switch has not been pressed (step S10, NO), the controller 100 returns to the previous step and repeats the determination. On the other hand, if the controller 100 determines that the switch has been pressed (step S10, YES), the controller 100 proceeds to step S20.

In step S20, the controller 100 outputs a control signal to the electromagnetic wave transmitter 10 so that a transmission wave (electromagnetic wave) is output. By such control, an electromagnetic wave having a predetermined reference frequency (4 GHz in this example) is output (emitted) from the electromagnetic wave transmitter 10 toward the RFID tag. In step S20, the controller 100 controls the electromagnetic wave transmitter 10 to output the electromagnetic wave of which frequency sweep is appropriately performed within the frequency range of the reference frequency (4 GHz)± several GHz.

In the following step S30, the controller 100 monitors the signal input from the electromagnetic wave receiver 20 and determines whether or not the reflected wave of the output electromagnetic wave of a predetermined frequency has been received. If the controller 100 determines that the reflected wave has not been received (step S30, NO), the controller 100 returns to the previous step and repeats the determination. Alternatively, if the controller 100 determines that the reflected wave has been received (step S30, YES), the controller 100 proceeds to step S40. The reflected wave of the tag used in this example is not only an electromagnetic wave having a reference frequency (66 GHz) but also one in which an absorption peak appears at a frequency shifted (deviated) from the reference frequency. Therefore, the controller 100 temporarily stores the information (that is, unprocessed data) of the absorption peak (resonance frequency) in each received reflected wave prior to the step S40.

In step S40, the controller 100 analyzes the unprocessed data of the received reflected wave (hereinafter, referred to as "reflected wave raw data)" and extracts the reflected wave information of the reference point(s) (plural points in this example). Here, the reference points can be configured to resonate at a reference frequency (4 GHz). Alternatively, the reference points may be configured to resonate at a frequency deviated by ± several GHz from the reference frequency. In this example, from the viewpoint of more accurately detecting the orientation and inclination of the tag, it is assumed that reference points are provided at respective corners of the rectangular tag.

In the following step S50, the controller 100 specifies the orientation and inclination of the tag to performs calibration processing based on the reflected wave information of the extracted respective reference points and, at the same time, analyzes the deviation amounts of the resonance frequency, phase, and amplitude derived from the specified orientation and inclination. Then, the controller 100 determines a correction value for correcting the reflected wave raw data based on the analyzed deviation amounts.

In the following step S60, the controller 100 corrects the reflected wave raw data according to the determined correction value to generate the correction data of the reflected wave information (hereinafter, referred to as "corrected reflected wave data"). Such corrected reflected wave data is generated for the reflected wave information at each received resonance frequency. As a result, information about the amplitude, peak frequency, and phase is corrected.

Subsequently, the controller 100 decodes the identification information formed in the RFID tag 200 from the generated corrected reflected wave data (that is, the reflected wave information at each corrected resonance frequency) (step S70).

Subsequently, the controller 100 performs control so that the decoded identification information is displayed on the display 40 (step S80).

Furthermore, the controller 100 monitors the input signal from the operation receiver 30 (step S90) and determines whether or not the switch is released (that is, whether or not the reading by the tag reader 2 is finished). If the controller 100 determines that the switch is not released (that is, it remains to be pressed) (step S90, NO), the controller 100 returns to step S10 and repeats the series of processes described above. Alternatively, if the controller 100 determines that the switch is released (step S90, YES), the controller 100 ends the series of processes.

As described above, according to the embodiment to which the present invention is applied, it is possible to improve the reading accuracy of the identification information carried on the RFID tag 200.

EXAMPLES

Hereinafter, with reference to FIG. 29 to FIG. 33, evaluation results will be explained with respect to the long-distance readability, transparent readability, peak sharpness, and scratch resistance of the RFID tag 200 in the present embodiment.
<Evaluation System>

Figure 29:
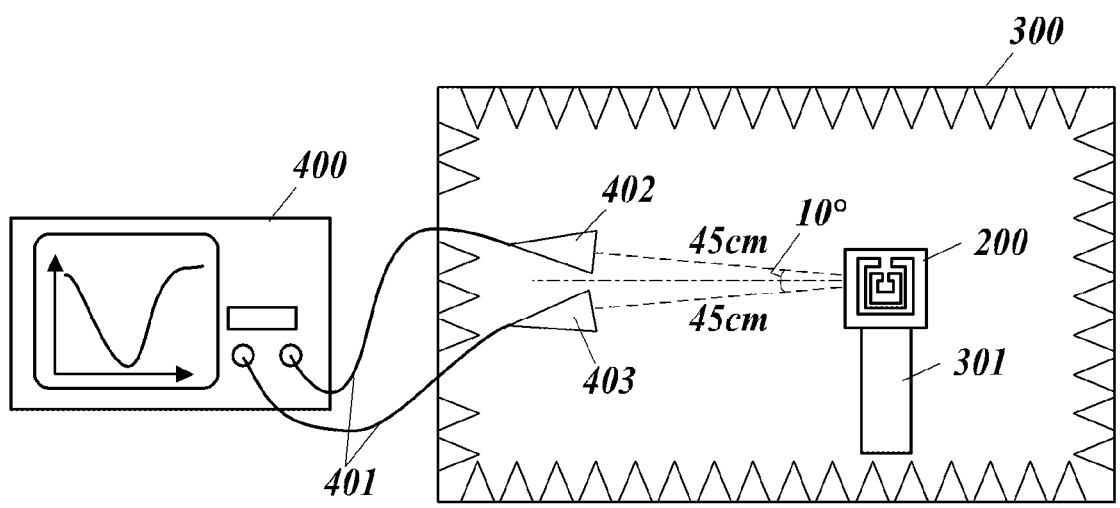
FIG. 29 is a diagram showing a configuration example for evaluating a reflected wave from a tag.

The reflected wave of the tag 200 was evaluated with a method described in the non-patent document (IEEE TRANSACTION ON MICROWAVE THEORY AND TECHNIQUES, VOL. 59, NO. 12, December 2011, 3356, Arnaud Vena.). Specifically, the tag 200 was installed on a sample installation table 301 in an anechoic chamber 300 as shown in FIG. 29, and the reflected wave was evaluated using an evaluation system constructed so as to enable irradiation of electromagnetic wave and measurement of the reflected wave with a transmitting antenna (Tx) 402 and a receiving antenna (Rx) 403 coupled to a vector network analyzer 400 via a coaxial cable 401. Horn antennas were used as the transmitting antenna (Tx) 402 and the receiving antenna (Rx) 403. The distances from the tag 200 to the transmitting antenna (Tx) 402 and to the receiving antenna (Rx) 403 were each 45 cm, and formed angles were each 100.

The vector network analyzer 400 was calibrated by so-called zero point correction (through calibration) in which the reflected wave of S21 was measured without installing a sample of the tag 200 (tag sample) on the sample installation table 301. Subsequently, a tag sample to be evaluated was installed on the sample setting table 301, and the reflected wave of S21 was measured by the vector network analyzer 400 to obtain a waveform corresponding to each tag sample.

Figure 31:
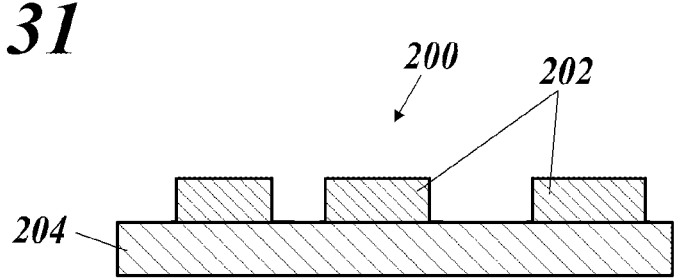
FIG. 31 is a cross-sectional view showing a configuration example of an RFID tag according to Comparative Embodiment 1.

FIG. 30 shows an example of the evaluation results. In FIG. 30, the item of "configuration of tag" indicates which configuration was used among the above-described Embodiments 1 to 22 and Comparative Embodiment 1 shown in FIG. 31. As shown in FIG. 31, Comparative Embodiment 1 is a tag 200 that does not include the buffer layer 201 and the metal sheet layer 203, but is composed of a substrate 204 having a relative permittivity of more than 2.5 and a metal pattern layer 202. The item of "when tag is stuck on surface of item" in FIG. 30 indicates the evaluation result of the long-distance readability when the configuration according to Embodiment 21 (the configuration in which the tag 200 is stuck on the front surface of the item 1 as the attachment target) is applied. On the other hand, the item of "when tag is stuck on inside of item" in FIG. 30 indicates the evaluation result of transparent readability when the configuration according to Embodiment 22 (the configuration in which the tag 200 is stuck on the back surface of the item 1 as the attachment target) is applied.
[Evaluation of Long-Distance Readability]

In order to detect the peak accurately, the difference in decibels between peaks and valleys of the reflected wave (amplitude of the reflected wave) needs to be 2 dB or more. The long-distance readability was evaluated using a small tag 200 having a size of 4 cm×4 cm according to the following criteria based on a distance in meter between the tag 200 and the tag reader 2 when the above difference in decibels is less than 2 dB as an index (see FIG. 30).
<Evaluation Criteria>
AA: 1.0 n or more
BB: 0.8 m or more, less than 1 m
CC: 0.5 m or more, less than 0.8 m
DD: less than 0.5 m Evaluations were made based on the above four.

As shown in FIG. 30, according to Examples 1 to 27 having the buffer layer 201 made of a material having a very low relative permittivity of 2.5 or less and the metal sheet layer 203, the evaluation results were BB or better except for the case where the tag 200 of Example 9 was stuck on the front surface of a steel plate (evaluation was CC). Meanwhile, according to Comparative examples 1 and 2 having no buffer layer 201 or the metal sheet layer 203, the evaluation results were DD. As can be seen from the above, by providing the buffer layer 201 and the metal sheet layer 203, it is possible to significantly increase the signal strength so that the long-distance readability of the tag 200 can be improved.

As shown in FIG. 30, according to Example 9 in which the buffer layer 201 was made of a porous material and had a thickness of 5 μm, the evaluation result was CC when the tag 200 was stuck on a front surface of a steel plate. Meanwhile, according Example 22 in which the buffer layer 201 was made of the metal dispersion dielectric and had a thickness of 5 µm, the evaluation result was BB when the tag 200 was stuck on a front surface of a steel plate. As can be seen from the above, by providing the buffer layer 201 made of the metal dispersion dielectric having a relative permittivity lower than the porous material, it is possible to make the buffer layer 201 thin.

As shown in FIG. 30, according to Example 9 in which the buffer layer 201 had a thickness of 5 µm, the evaluation result was CC when the tag 200 was stuck on a front surface of a steel plate. Meanwhile, according Example 8 in which the buffer layer 201 had a thickness of 10 µm, the evaluation result was BB when the tag 200 was stuck on a front surface of a steel plate. As can be seen from the above, by providing the buffer layer 201 having a thickness of 10 µm or more, it is possible to increase the signal strength as a result or a resonance phenomenon generated between the metal pattern layer 202 and the metal sheet layer 203, and to improve the long-distance readability of the tag 200.

Here, when the material of the buffer layer 201 is the metal dispersion dielectric as described above, the same evaluation result can be obtained even when the buffer layer 201 has a thickness of 5 µm. Because the buffer layer 201 needs to be able to suppress the peak shift of the resonance frequency even when the tag 200 is stuck on the item 1 as the attachment target, the thickness of the buffer layer 201 is usually 100 nm or more, preferably 1 µm or more, and more preferably 5 µm or more.

From the viewpoint of thinning the entire RFID tag 200, the total thickness of the buffer layer 201, the metal pattern layer 202, and the metal sheet layer 203 is preferably 1 mm or less.

As shown in FIG. 30, according to Example 9 having the buffer layer 201 whose relative permittivity εr was 2.5 but not having the electromagnetic wave absorbing layer 208, the evaluation result was BB. Meanwhile, according Example 16 having the buffer layer 201 whose relative permittivity εr was 2.5 and having the electromagnetic wave absorbing layer 208, the evaluation result was AA. As can be seen from the above, by providing the electromagnetic wave absorbing layer 208, it is possible to increase the signal strength and to improve the long-distance readability of the tag 200.

[Evaluation of Transparent Readability]

In order to detect the peak accurately, the difference in decibels between peaks and valleys of the reflected wave (amplitude of the reflected wave) needs to be 2 dB or more. The transparent readability was evaluated using a small tag 200 having a size of 4 cm×4 cm according to the following criteria based on a distance in meter between the tag 200 and the tag reader 2 when the above difference in decibels is less than 2 dB as an index (see FIG. 30).

<Evaluation Criteria>
AA: 1.0 m or more
BB: 0.8 m or more, less than 1 m
CC: 0.5 m or more, less than 0.8 m
DD: less than 0.5 m Evaluations were made based on the above four.

As shown in FIG. 30, according to Examples 1 to 27 having the buffer layer 201 made of a material having a very low relative permittivity of 2.5 or less and the metal sheet layer 203 the evaluation results were BB or better. Meanwhile, according to Comparative examples 1 and 2 having no buffer layer 201 or the metal sheet layer 203, the evaluation results were DD. As can be seen from the above, by providing the buffer layer 201 and the metal sheet layer 203, it is possible to significantly increase the signal strength so that the transparent readability of the tag 200 can be improved.

As shown in FIG. 30, according to Example 9 in which the buffer layer 201 was made of a porous material and had a thickness of 5 µm, the evaluation result was BB. Meanwhile, according Example 22 in which the buffer layer 201 was made of a metal dispersion dielectric and had a thickness of 5 µm, the evaluation result was AA. As can be seen from the above, by providing the buffer layer 201 made of the metal dispersion dielectric having a relative permittivity lower than the porous material, it is possible to make the buffer layer 201 thin.

As shown in FIG. 30, according to Examples 9 and 22 in which the buffer layer 201 had the minimum thickness of 5 µm, the evaluation result was BB when the tag 200 was stuck on a front surface of a steel plate. As can be seen from the above, by providing the buffer layer 201 having a thickness of 5 µm or more, it is possible to increase the signal strength as a result or a resonance phenomenon generated between the metal pattern layer 202 and the metal sheet layer 203, and to improve the transparent readability of the tag 200.

As shown in FIG. 30, according to Example 9 having the buffer layer 201 whose relative permittivity εr was 2.5 but not having the electromagnetic wave absorbing layer 208, the evaluation result was BB. Meanwhile, according Example 16 having the buffer layer 201 whose relative permittivity εr was 2.5 and having the electromagnetic wave absorbing layer 208, the evaluation result was AA. As can be seen from the above, by providing the electromagnetic wave absorbing layer 208, it is possible to increase the signal strength and to improve the transparent readability of the tag 200.

[Evaluation of Peak Sharpness]

Figure 32:
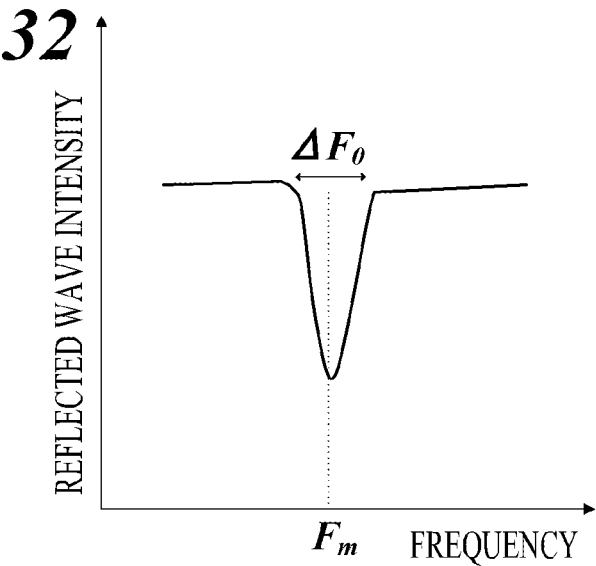
FIG. 32 is a diagram showing a center frequency and an occupied frequency bandwidth of one peak of a resonance peak that are necessary for evaluating peak sharpness.
Figure 33:
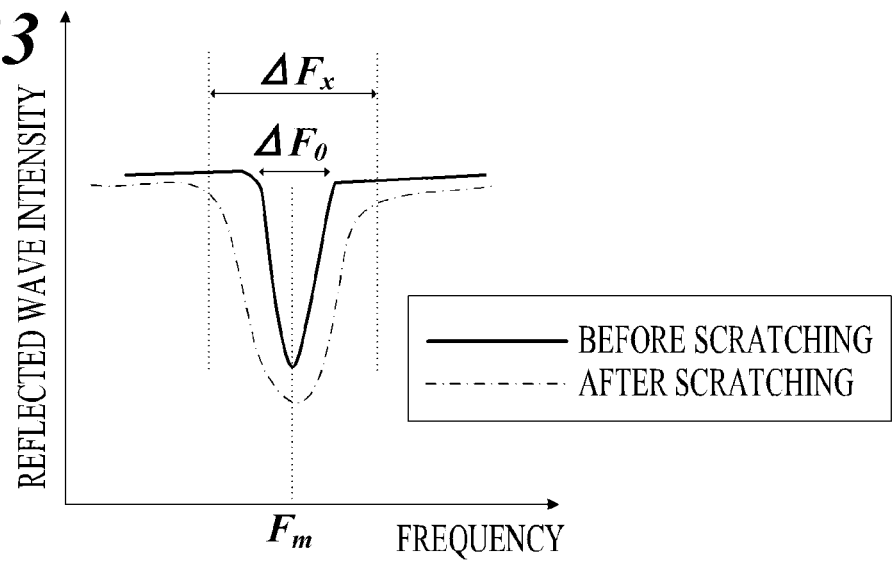
FIG. 33 is a diagram showing an occupied frequency bandwidth of one peak after scratching that is necessary for scratch resistance evaluation.

Next, the reflected wave of S21 was measured from a small tag 200 having a size of 4 cm×4 cm to determine a center frequency $F_m$ of the resonance peak and an occupied frequency bandwidth $\Delta F_0$ of one peak (see FIG. 32). Subsequently, the peak sharpness was evaluated according to the following criteria based on the formula "$F_m/\Delta F_0$" that is used to obtain Q value, an index of the peak sharpness (whether the peak is easily detected) (see FIG. 30).

<Evaluation Criteria>
AA: less than 1.1
BB: 1.1 or more, less than 1.2
CC: 1.2 or more, less than 1.3
DD: 1.3 or more Evaluations were made based on the above four.

As shown in FIG. 30, according to Example 12 in which the metal pattern layer 202 had a surface roughness Rz of 5 µm, the evaluation result was CC. Meanwhile, according Example 11 in which the metal pattern layer 202 had a surface roughness Rz of 3 µm, the evaluation result was BB. As can be seen from the above, by providing the metal pattern layer 202 having a surface roughness of 3 µm or less, it is possible to improve detection of the peak of the reflected wave and to read the identification information carried on the tag 200 accurately.

As shown in FIG. 30, according to Example 14 in which the distance between adjacent metal patterns was 0.3 mm, the evaluation result was CC. Meanwhile, according Example 13 in which the distance between adjacent metal patterns was 0.5 mm, the evaluation result was BB. As can be seen from the above, by setting the distance between adjacent metal patterns to 0.5 mm or more, it is possible to improve detection of the peak of the reflected wave and to read the identification information carried on the tag 200 accurately.

[Evaluation of Scratch Resistance (Evaluation when Scratched)]

Next, a small tag 200 having a size of 4 cm×4 cm was fixed to a laboratory table with double-sided tape with the metal pattern layer 202 facing upward. Subsequently, the tag was scratched by being rubbed with cardboard that was reciprocated 10 times within a range of 100 mm at a speed of 30 mm/sec. The cardboard had a size of 10 cm×10 cm and a thickness of 3 mm, and a load of 0.5 kg/cm² was applied thereto. Subsequently, the reflected wave of S21 of the tag 200 was measured with the vector network analyzer 400, and the occupied frequency bandwidth $\Delta F$ of one peak (after scratching) was obtained (see FIG. 33). Subsequently, the ratio "$\Delta F_x/\Delta F_0$" of $\Delta F_x$ to $\Delta F_0$, which was the occupied frequency bandwidth of the tag 200 before scratching, was taken, and the scratch resistance was evaluated according to the following criteria (see FIG. 30).

<Evaluation Criteria>
AA: less than 1.1
BB: 1.1 or more, less than 1.2
CC: 1.2 or more, less than 1.3
DD: 1.3 or more Evaluations were made based on the above four.

As shown in FIG. 30, according to Example 15 in which the protection layer 207 was provided on the surface of the metal pattern layer 202, the evaluation result was AA. Meanwhile, according Examples 1 to 14 and 16 to 27 in which no protection layer 207 was provided on the surface of the metal pattern layer 202, the evaluation result was BB. As can be seen from the above, it is possible to prevent the metal pattern from being scratched, and the tag 200 can be used with confidence even in an environment where the metal pattern is easily scratched, such as outdoors. Furthermore, since it is possible to suppress disconnection due to wear of the metal pattern layer 202 and to suppress broadening of the resonance frequency peak of the reflected waveform, the tag 200 has improved durability and can be used for a wider range of purposes.

Examples of the method of forming (patterning) the metal pattern layer 202 in the present embodiment include a method of forming the metal pattern layer 202 only by a "printing method" and a method of forming the metal pattern layer 202 in two steps by a "punching method" and a "printing method" or by an "etching method" and a "printing method." In the method of forming the metal pattern layer 202 in two steps by the "punching method" and the "printing method" or by the "etching method" and the "printing method," specifically, a part (master pattern) of the metal pattern layer 202 is formed by a punching method (punching step) or an etching method (etching step) of metal foil, and a part of the metal pattern layer 202 that is not formed in the punching step or the etching step (a part other than the master pattern) is formed by inkjet printing, screen printing, thermal printing, flexographic printing, or using a dispenser (printing step). The printing method used for manufacturing the RFID tag 200 is not particularly limited, and various printing methods other than the above can be applied.

In manufacturing the tag 200, for example, the tag of FIG. 1 may be folded with the metal sheet layer 203 side being inside (valley-folding step), so as to have the metal pattern layers 202 arranged on both surfaces.

In addition, all of the above embodiments are merely examples specifically shown for carrying out the present invention, and the technical scope of the present invention should not be construed in a limited manner by them. That is, the present invention can be implemented in various forms without departing from its gist or its main features.

INDUSTRIAL APPLICABILITY

The present invention can be applied to a contactlessly readable tag, a method of manufacturing the contactlessly readable tag, an identification device, and an identification information determination system.

REFERENCE SIGNS LIST

1 Item as Attachment Target
2 Tag Reader (Identification Device)
10 Electromagnetic Wave Transmitter
20 Electromagnetic Wave Receiver
30 Operation Receiver
40 Display
100 Controller (Identifier)
200 RFID Tag (Contactlessly Readable Tag)
201 Buffer Layer (Intermediate Layer)
202 Metal Pattern Layer
203 Metal Sheet Layer (Conductive Layer)
204 Substrate
205 Adhesive Layer
206 Release Sheet Layer
207 Protection Layer
208 Electromagnetic Wave Absorbing Layer
30 Anechoic Chamber
301 Sample Installation Table
400 Vector Network Analyzer
401 Coaxial Cable
402 Transmitting Antenna (Tx)
403 Receiving Antenna (Rx)

The invention claimed is:

1. A contactlessly readable tag comprising:
a metal pattern layer;
a conductive layer; and
at least one intermediate layer that has a relative permittivity of 0 or more and 2.5 or less and that is provided between the metal pattern layer and the conductive layer, wherein
the metal pattern layer includes a metal part whose arrangement pattern corresponds to identification information,
the identification information is configured to be identified based on information on an electromagnetic wave that is reflected by the contactlessly readable tag in response to irradiation of the contactlessly readable tag with an electromagnetic wave, and
the metal pattern layer is provided closer to a reading surface of the contactlessly readable tag than at least one of the intermediate layer.

2. The contactlessly readable tag according to claim 1, wherein the intermediate layer includes at least one of a porous material, a non-woven fabric, and a metal dispersion dielectric.

3. The contactlessly readable tag according to claim 1, wherein the intermediate layer has a bulkhead structure or a pillar structure.

4. The contactlessly readable tag according to claim 1, wherein the metal pattern layer and the intermediate layer are provided on each of both surfaces of the conductive layer.

5. The contactlessly readable tag according to claim 1, wherein the intermediate layer has a thickness of 5 μm or more.

6. The contactlessly readable tag according to claim 1, further comprising:
an adhesive layer that attaches the contactlessly readable tag to an attachment target.

7. The contactlessly readable tag according to claim 1, further comprising:
a protective layer that is provided on a surface of the metal layer and protects the metal pattern layer.

8. The contactlessly readable tag according to claim 1, further comprising:
an electromagnetic wave absorbing layer between the metal pattern layer and the conductive layer.

9. The contactlessly readable tag according to claim 1, wherein the metal pattern layer has a surface roughness Rz of 3 μm or less.

10. The contactlessly readable tag according to claim 1, wherein
the metal pattern layer includes a plurality of electrically insulated metal patterns, and
among the metal patterns, adjacent metal patterns are separated from each other by 0.5 mm or more.

11. The contactlessly readable tag according to claim 1, wherein a total thickness of the metal pattern layer, the intermediate layer, and the conductive layer is 1 mm or less.

12. An identification device configured to identify the contactlessly readable tag according to claim 1, comprising:
an identifier that identifies, based on an amplitude, phase, or frequency of a reflected electromagnetic wave that are reflected by the contactlessly readable tag in response to irradiation of the contactlessly readable tag with an electromagnetic wave, identification information corresponding to an amplitude, phase, or frequency of the electromagnetic wave.

13. An identification information determination system comprising:
the contactlessly readable tag according to claim 1; and
an identification device configured to identify the contactlessly readable tag,
wherein the identification device comprises an identifier that identifies, based on an amplitude, phase, or frequency of a reflected electromagnetic wave that are reflected by the contactlessly readable tag in response to irradiation of the contactlessly readable tag with an electromagnetic wave, identification information corresponding to an amplitude, phase, or frequency of the electromagnetic wave.

14. A method of manufacturing a contactlessly readable tag including a metal pattern layer, a conductive layer, and an intermediate layer that has a relative permittivity of 0 or more and 2.5 or less and that is provided between the metal pattern layer and the conductive layer, the method comprising:
printing in which the metal pattern layer is formed by inkjet printing, by screen printing, by thermal printing, by flexographic printing, or with a dispenser, wherein the metal pattern layer includes a metal part whose arrangement pattern corresponds to identification information, and
the identification information is configured to be identified based on information on an electromagnetic wave that is reflected by the contactlessly readable tag in response to irradiation of the contactlessly readable tag with an electromagnetic wave.

15. The method of manufacturing a contactlessly readable tag according to claim 14, further comprising:
punching in which a part of the metal pattern layer is formed by punching metal foil or by etching metal foil,
wherein, in the printing, a part of the metal pattern layer that is not formed in the punching or in the etching is formed by inkjet printing, by screen printing, by thermal printing, by flexographic printing, or with a dispenser.

16. A method of manufacturing a contactlessly readable tag including a metal pattern layer, a conductive layer, and an intermediate layer that has a relative permittivity of 0 or more and 2.5 or less and that is provided between the metal pattern layer and the conductive layer, the method comprising:
valley-folding in which the metal pattern layer is arranged on each of both surfaces by folding the tag with the conductive layer side being inside, wherein
information identifying the contactlessly readable tag is configured to be identified based on information on an electromagnetic wave that is reflected by the contactlessly readable tag in response to irradiation of the contactlessly readable tag with an electromagnetic wave, and
the metal pattern layer is provided closer to a reading surface of the contactlessly readable tag than the intermediate layer.

* * * * *